US008815968B2

(12) United States Patent
Rowlands et al.

(10) Patent No.: US 8,815,968 B2
(45) Date of Patent: Aug. 26, 2014

(54) POLYURETHANE FOAM

(75) Inventors: Jeffrey Philip Rowlands, Walton on Trent (GB); Frans Paap, Seigneulles (FR)

(73) Assignee: Green Urethanes Limited (GB)

( * ) Notice: Subject to any disclaimer, the term of this patent is extended or adjusted under 35 U.S.C. 154(b) by 201 days.

(21) Appl. No.: 12/716,684

(22) Filed: Mar. 3, 2010

(65) Prior Publication Data
US 2010/0227151 A1  Sep. 9, 2010

(30) Foreign Application Priority Data

| Mar. 4, 2009 | (GB) | .................................. 0903717.7 |
| Apr. 6, 2009 | (GB) | .................................. 0905948.6 |
| Jun. 3, 2009 | (GB) | .................................. 0909563.9 |
| Jun. 11, 2009 | (GB) | .................................. 0910063.7 |
| Jul. 20, 2009 | (GB) | .................................. 0912558.4 |
| Oct. 7, 2009 | (GB) | .................................. 0917550.6 |

(51) Int. Cl.
C08G 18/00 (2006.01)
C08G 18/48 (2006.01)
C08G 18/28 (2006.01)
C08G 18/24 (2006.01)
C08G 18/22 (2006.01)
C08G 101/00 (2006.01)

(52) U.S. Cl.
CPC .... C08G 18/2815 (2013.01); *C08G 2101/0008* (2013.01); C08G 18/4891 (2013.01); *C08G 2101/005* (2013.01); *C08G 2101/0083* (2013.01); *C08G 2101/0025* (2013.01); C08G 18/244 (2013.01); C08G 18/222 (2013.01)
USPC .......................................... 521/159; 521/170

(58) Field of Classification Search
USPC .................................. 521/159, 170
See application file for complete search history.

(56) References Cited

U.S. PATENT DOCUMENTS

| 4,148,840 | A * | 4/1979 | Shah .............................. 521/137 |
| 4,243,792 | A * | 1/1981 | Short .............................. 528/73 |
| 4,508,853 | A * | 4/1985 | Kluth et al. .................... 521/107 |
| 4,742,087 | A * | 5/1988 | Kluth et al. .................... 521/107 |
| 5,618,854 | A * | 4/1997 | Skorpenske et al. ........... 521/164 |
| 6,107,355 | A * | 8/2000 | Horn et al. ....................... 521/51 |
| 6,255,431 | B1 * | 7/2001 | Fishback et al. ................. 528/44 |
| 6,359,023 | B1 * | 3/2002 | Kluth et al. .................... 521/155 |
| 6,552,097 | B1 * | 4/2003 | Pauls et al. ..................... 521/114 |
| 7,678,936 | B2 * | 3/2010 | Jones et al. ...................... 560/25 |
| 2002/0192456 | A1 * | 12/2002 | Mashburn et al. .......... 428/318.4 |
| 2004/0102596 | A1 * | 5/2004 | Kurth .............................. 528/44 |
| 2005/0070620 | A1 | 3/2005 | Herrington et al. |
| 2006/0251881 | A1 * | 11/2006 | Gilder ........................ 428/317.1 |
| 2008/0096995 | A1 * | 4/2008 | Bedri et al. .................... 521/160 |
| 2010/0096768 | A1 * | 4/2010 | Sasaki et al. ..................... 264/54 |
| 2010/0197878 | A1 * | 8/2010 | Casati et al. ................... 526/319 |
| 2010/0204353 | A1 * | 8/2010 | Casati ........................... 521/137 |
| 2010/0249260 | A1 * | 9/2010 | Casati et al. ................... 521/170 |
| 2010/0286299 | A1 * | 11/2010 | Casati et al. ................... 521/170 |
| 2011/0015292 | A1 * | 1/2011 | Radhakrishnan et al. .... 521/170 |
| 2011/0086215 | A1 * | 4/2011 | Casati et al. ............... 428/304.4 |

FOREIGN PATENT DOCUMENTS

| EP | 1013704 | 6/2000 |
| EP | 2062927 | 5/2009 |
| GB | 952 116 | 3/1964 |
| JP | 2008 056779 | 3/2008 |
| WO | WO 04/000905 A1 | 12/2003 |
| WO | WO-2006047434 A1 * | 5/2006 |
| WO | WO 2008/116605 A1 | 10/2008 |
| WO | WO 2009/026424 | 2/2009 |
| WO | WO-2009020774 * | 2/2009 |
| WO | WO2009/029621 | 3/2009 |
| WO | WO 2009/152304 | 12/2009 |

OTHER PUBLICATIONS

Search Report for PCT/GB2010/000381.
Luciane L Monteavaro et al: Polyurethane Networks from formiated Soy Polyols: Synthesis and Mechanical Charecterization Journal of the American Oil Chemists' Society, Springer Berlin, vol. 82, No. 5, Jan. 2005, p. 365.

* cited by examiner

*Primary Examiner* — Melissa Rioja
(74) *Attorney, Agent, or Firm* — Notaro, Michalos & Zaccaria P.C.

(57) ABSTRACT

A method of making a polyurethane foam from a mixture of isocyanate modified polyol and foam-forming ingredients, wherein the isocyanate modified polyol is made by reacting at least one polyol with at least one multifunctional isocyanate, wherein the isocyanate modified polyol is a non-foamed polyol polymer having available OH groups, wherein the foam forming ingredients comprise at least a multifunctional isocyanate and a foaming agent, preferably water, and characterized in that (i) the at least one polyol from which the isocyanate modified polyol is made comprises at least one lipid-based polyol which has undergone reaction with the isocyanate in the presence of a PU gelation catalyst, and/or (ii) the isocyanate modified polyol is mixed with a lipid-based polyol prior to, or at the same time as, foaming.

20 Claims, 1 Drawing Sheet

POLYURETHANE FOAM

FIELD AND BACKGROUND OF THE INVENTION

This invention relates to polyurethane (PU) foam made from lipid-based polyols, and in particular to flexible PU foam although rigid, semi-flexible/semi-rigid and microcellular foams are also envisaged.

Methods for the manufacture of polyurethane foams (eg flexible PU foams) are known in the art and are covered, for example, on pages 170-235 of the Plastics Manual, Volume 7, Polyurethanes, Becker/Braun, 2nd edition, published by Carl Hanser Verlag.

Conventionally, PU foam (eg flexible, semi flexible and rigid PU foams) may be made by reacting a polyol with a multifunctional isocyanate so that NCO and OH groups form urethane linkages by an addition reaction, and the polyurethane is normally foamed with carbon dioxide produced in situ by reaction of isocyanate with water, although other volatile non reactive solvents and gases e.g acetone, pentane and injected carbon dioxide and mechanical frothing may be used to form the cell spaces within the foam.

This conventional process may be carried out as a so-called 'one-shot' process whereby the polyol, isocyanate and water and/or solvent are mixed together with catalysts and other additives so that the polyurethane is formed and foamed in the same step. The process may be carried out under conditions of increased or reduced atmosphere pressure so as to effect the density and other characteristics of the final product.

It is however also known to use a two step process whereby in a first step polyol is reacted with isocyanate to give a so-called 'isocyanate modified polyol' and this is foamed, by reaction of isocyanate and water, with or without inert solvent and or gases, to produce carbon dioxide, in a second step.

It is desirable to make Urethane foams (microcellular, rigid, semi flexible/semi rigid and flexible) from lipid-based polyols such as natural oil based polyols (NOPs). At the moment, at the date of this application, there are limits to the maximum level of incorporation of NOPs into urethane formulations, for example in one of the biggest potential uses for NOPs, in the so called conventional flexible slabstock foam market, a maximum of only approximately 22 percent (php) of the crude oil based polyol can be replaced by an NOP. Higher incorporation level than this may be theoretically possible but even by 30 php in conventional flexible foams, the materials do not have good enough physical properties (such as good compression set, low foam settle after full rise, good foam processing and processing safety, good foam stability, good hand touch including resilience and ball rebound, good SAG (support factor), good flammability, low hysteresis loss and good foam hardness) to be useable by most customers. In HR (High Resilient) foam formulations the tolerated limit of inclusion of NOPs can be as low as 5 php but is typically about 10 php. Above the levels discussed generally here, unacceptable faults, for example, internal faults or "splits", also pockets of collapsed foam may appear in the material and this can be a visual sign that instability may be about to occur leading to the material being a loss or fit only for scrap. The limited inclusion of NOPs is seen for instance in examples in Renosol WO 2009/026424.

The incorporation of these NOP materials into Urethane formulations is complex for two major reasons. The first is that NOPs, by their very structures, are hydrophobic as the chains do not contain oxygen linkages (ether or ester) compared to standard petroleum based Urethane raw materials. As such they do not readily mix and therefore do not readily react with other components also present in the formulation, which have been developed prior to the introduction of NOPs.

The second problem is that in NOPs the OH groups are generated by utilization of double bonds, transesterification with multifunctional alcohols or radical cleavage/oxidation. All of these tend to give sterically hindered hydroxyl groups, distributed at specific points along the carbon chain of the natural oil, as opposed to being placed at the end of the chain which is the case for standard petrochemical (crude oil) derived polyols. The NOP's hydroxyl groups are naturally therefore of lower reactivity than conventional (or alkyleneoxy) based polyols.

The smell of foams containing natural oil-based polyols can also be a problem, since an odour of "French Fries" or "Freedom Fries" (hot cooking oil) has been noted. This odour is thought to be the result of the presence of such materials as, but not restricted to, hexanal, nonanal, decanal and other aldehydes, and/or ketones and carboxylic acids and other derivatives, in or originating from the original natural oil-based polyol production process, and would preferably be avoided, minimised or removed. The odour effect of these and other odour materials is lessened or eliminated during the stage at which the natural oil-based polyol is transformed into the isocyanate modified polyol in a "pre treatment" according to the present invention.

SUMMARY OF THE INVENTION

In accordance with a first aspect of the present invention, there is provided a method of making a polyurethane (PU) foam, preferably a flexible PU foam, from a mixture of isocyanate modified polyol (eg prepolymer) and foam-forming ingredients, wherein the isocyanate modified polyol is made by reacting at least one polyol with at least one multifunctional isocyanate, wherein the isocyanate modified polyol is a non-foamed polyol polymer having available OH groups, wherein the foam-forming ingredients comprise at least a multifunctional isocyanate and a foaming agent, preferably water, and characterised in that (i) the at least one polyol from which the isocyanate modified polyol is made comprises at least one lipid-based polyol which has undergone reaction with the isocyanate in the presence of a PU gelation catalyst, and/or (ii) the isocyanate modified polyol is mixed with a lipid-based polyol prior to, or at the same time as, foaming.

In accordance with a further aspect of the present invention, a foam product formed by the above-described method is provided.

In a yet further embodiment, there is provided a storage stable isocyanate modified polyol (eg a prepolymer) for use in the manufacture of (preferably flexible) polyurethane foam made by reacting at least one polyol with at least one multifunctional isocyanate, wherein the proportion of the isocyanate is in the range 0.01% (preferably 0.05%, most preferably 0.1%) to 70%, preferably 60%, preferably 50%, preferably 33%, most preferably 30% by weight of the theoretical amount of the isocyanate required to react with all available hydroxyl groups of the polyol, wherein the isocyanate modified polyol has hydroxyl groups available for reaction with further isocyanate, and wherein the at least one polyol from which the isocyanate modified polyol is made comprises a lipid-based polyol which has undergone reaction with an isocyanate preferably in the presence of a PU gelation catalyst.

There is also provided a method of making a polymer modified polyol, for use in making a PU foam, wherein this method requires a carrier polyol, and wherein this carrier polyol is a isocyanate modified polyol (eg a prepolymer)

made by reacting at least one polyol with at least one multifunctional isocyanate, wherein the isocyanate modified polyol is a non-foamed polyol isocyanate modified polyol having available OH groups, wherein the foam-forming ingredients comprise at least a multifunctional isocyanate and water, and characterised in that (i) the at least one polyol from which the isocyanate modified polyol is made comprises a lipid-based polyol which has undergone reaction with the isocyanate in the presence of a PU gelation catalyst, and/or (ii) the isocyanate modified polyol is mixed with a lipid-based polyol prior to, or at the same time as, foaming.

As used herein, PU gelation catalyst means a substance useful in catalysing the addition reaction which occurs between hydroxyl and isocyanate groups in the formation of urethane linkages in the production of PU, particularly PU foam, especially flexible PU foam. Such catalysts are well known in the art and many such catalysts are widely available for use in the production of PU. Suitable catalysts may be metal salts, organo-metallic substances, or even organic compounds, as discussed further herein.

It is proposed that the invention makes the reaction characteristics and dynamics of NOPs (and other lipid-based polyols) more similar to the characteristics of the petrochemical derived polyol present in the foam reaction mixture. The characteristic hydrophobic nature of all NOPs is lessened and the NOP's reactivity is made more similar to that of the petrochemical polyol present. The result, we believe, is that the NOP and standard polyol are therefore distributed more evenly throughout the macro polymer chain formed by the final, material forming, urethane reaction, instead of the NOP reacting relatively late, due to steric hindrance and hydrophobic nature, compared to the standard polyol thus avoiding adverse plasticising effects, stability effects and physical property effects, especially those effecting the material's hardness tensile tear elongation and compression set characteristics. The adverse physical property effects, we propose, happen when the macro polymer built up mainly by relatively early reaction of the petroleum based polyol is then mainly coated on its outer surface by the macro polymer strands formed by the polyurethane reaction with the NOP because of the delay by the NOP reacting late, into the macro polymer chain. This is thought to be especially effect NOPs which have relatively low hydroxyl functionality, for example, the Mesocarp sourced Palm oil based polyol which is part of this invention has a declared functionality of 1.5 which is very different from the functionality of 3 which for example is common for most crude oil based polyols with which the NOP may be mixed in the course of making a conventional slabstock foam.

One possible explanation for the mechanism of the present invention is that the pre-reaction of the NOP (or other lipid-based polyol) with isocyanates actually increases the reactivity of the product by coupling polymer molecules and creating species that have OH groups more readily available for reaction. Adding PU gelation catalysts (preferably metal acid salts, or organometallic catalysts) will specifically drive the reaction towards making the more sterically hindered groups particularly of the lower molecular weight oligomers present, react preferentially. This would further increase the average, overall reactivity of the material. People skilled in the art would have previously been dissuaded from taking this step in the past as this would in theory further reduced detrimentally, the reactivity (hence processability and resulting physical properties) of the material. The use of ricinolate salts, in particular, can also create special complexes that can trap lower molecular weight compounds or react with them. Suitable catalysts include metal salts (eg calcium or sodium salts) of an organic acid having no metal-carbon bonds, such as catalysts of the formula $M(O.CO.R.CH_3)_2$ wherein M is a metal (preferably tin or zinc) and R is a carbon chain, such as a monohydroxy fatty acid, eg ricinoleate. Preferably catalysts having a long carbon chain are used, for example at least 6 carbon atoms, more preferably 6-20 carbon atoms. Most preferably at least 12 carbon atoms are present in the chain, eg 12-20 carbon atoms. Alternative suitable catalysts include stannous dilaurate, stannous dipalmitate, stannous distearate, stannous dioleate, zinc dineodecanoate, and bismuth trineodecanoate. The amount of catalyst is preferably at least 0.001 mMoles/100 g polyol, preferably 0.001-0.1 mMoles/100 g polyol, although higher levels may also be used, as discussed in more detail hereinafter.

NOPs typically contain a large, wide, distribution of different molecular weight Oligomers which react at different rates as the main polyurethane polymerisation reaction proceeds. The molecular weight bell curve distribution for NOPs is therefore far flatter and lower than would be tolerated normally in a polyol component, compared to the tight, high bell curve that a petroleum based polyol, which has been perfected and engineered over the years, possesses. (See Polyurethane Handbook Oertel, published by Hanser 1994, $2^{nd}$ Edition Page 57 and references cited 29 & 30.) WO 2006/116456 Abraham et al, explains that low level inclusion of NOP may be successful if 35% of oligomers are tetramers or higher, 5 to 10% are trimers and dimers are limited to 8 to 12%. This though still leads to different NOP oligomers with different molecular weights reacting at different stages and times of the production reaction. This will give difficult processing and a profusion of short chain polymers being produced which will give inferior physical properties in the finished coating, adhesive, or foam which properties are characteristic of formulations which contain even moderate levels of NOP materials.

The invention, preferentially reacts the short chain triglycerides of the NOP, especially monomers and dimer oligomers into higher molecular weight polymers. These, the most undesirable oligomers will be preferentially reacted because they are naturally more reactive to the isocyanate and so are most preferably "cleaned up". Additional chain extension reactions will take place between other classes of oligomers leading to tri and tetra species etc also undergoing reactions with either lower molecular weight oligomers or higher molecular weight species. The reaction will steepen and tighten the bell curve distribution of the oligomer species in the NOP. This formation of macro molecules, therefore, prior to the manufacture step to produce the foam will give higher hardness to the product, better processing and better physical properties compared to inclusion without "prereaction" or "pre treatment" of the NOP as described in the present invention.

If the whole of the polyol element (NOP and petrochemical derived polyol) is subject to the invention then the plasticising effect of the NOP during product production is further minimised, the miscibility of the NOP element, the size of the macromolecule and optimisation of the physical properties of the material produced are further improved to the maximum extent. As a result, the lipid-based polyol content of polyurethane according to the present invention can be up to 100% (relative to total polyol content by weight) and may be at least 7% or 16% by weight, and in particularly preferred ranges can be greater than 20%, 30%, 35%, 40%, 50%, 75%, 80% or 90% or more by weight, as discussed further hereinafter.

The foam can be a flexible foam, or alternatively a semi-flexible, semi-rigid, microcellular or rigid foam. The foams can be made with or without water. They can be mechanically frothed or not mechanically frothed. Further the foams can use auxiliary non-reactive blowing agents as are known in the art.

BRIEF DESCRIPTION OF THE DRAWING

In the drawing FIG. 1 is a photograph showing separation which occurs under certain conditions on the right where almost complete separation of two polyols in a short time period occurs, and on the left where an identical mixture which has been agitated and reacted as described in the invention is shown.

DESCRIPTION OF THE PREFERRED EMBODIMENT

In a preferred embodiment, the isocyanate modified polyol is made by reacting at least one lipid-based polyol and at least one further polyol with at least one multifunctional isocyanate. The further polyol(s) can be any polyol described herein.

Preferably, the lipid-based polyol is a mono or higher functionality unsaturated triglyceride of a fatty acid which has undergone hydroxylation, such as a natural oil based polyol. Alternatively, however, it can be an animal based oil/fat or a fish based oil. Most preferably the lipid-based polyol comprises a soybean based polyol, a castor oil based polyol, a palm based polyol, a rape seed based polyol or mixtures thereof. Specific examples of suitable polyols include Lupranol Balance 50 a castor oil based polyol sold by BASF AG with a natural oil content of approximately 31%; Soyol 2101 and Soyol D09004 soybean oil based polyols made by United Soy Systems Company of Volga, S. Dak. USA; Enviropol 201 a polyol based on Rape Seed Oil from IFS Chemical Group of Roydon, Kings Lynn, Norfolk, England; BiOH 5000 a soybean oil based polyol made by Cargill Inc of Minnesota, USA; and F6012 a mesocarp palm oil based polyol made by PolyGreen Chemicals (Malaysia) Sdn. Bhd. of Kuala Lumpur, Malaysia.

Lipid-based polyols can comprise up to 100% of the total polyol present in the overall composition, but preferably the amount of lipid-based polyol is substantially different from 50% by weight of the total polyol present in the overall composition, eg less than 45% or more than 55%, preferably less than 40% or more than 60%, most preferably less than 30% or more than 70% or more than 80% or more than 90%.

Foams made according to the present invention show very good physical properties and compression sets, in particular where the foams also contain non reactive flame retardants or other emolliating agents known in the art such as Mesamoll or Mersolat H-40 both from Bayer Ag of Germany.

In detail, foams made according to the invention can be processed, without showing instability, internal splits or even collapse, with higher proportions of natural oil-based or other lipid-based polyols than would be the case without using techniques in this invention. Because of this, an increase in compatibility between these natural oil-based/lipid-based polyols and petrochemical (crude oil) based polyols which come from totally different raw material routes is obtained. Because the compatibility of the system is enhanced, the degradation of the mechanical properties of the resultant foam, for example, but not limited to, hardness, tensile tear and elongation at break, flammability and compression sets normally seen when natural oil-based/lipid-based polyols are included in foam formulations, is lessened or eliminated.

Prior art problems of compatibility between the natural oil-based/lipid-based polyols and petrochemical polyols in the foam formulation were known to result in internal faults, ranging from foam shrinkage to internal splits to foam collapse which would make it the foam or urethane material unsaleable, and could also cause scorch and cause autoignition of the foam after production if the instability of the foam was severe. Increasing the compatibility of natural oil-based polyols means that greater percentages of natural oil-based polyols may be incorporated into production of HR foams which have previously had a low tolerance of natural oils and natural oil based products. Their prior art incorporation at even low levels (between say 5 to 10 php by weight) typically caused foam instability and collapse in HR technology. HR foams are inherently less stable than conventional foams and it is for this reason that they can tolerate lower levels of NOP addition than so called conventional foam types.

Lipid-based polyols useful in the polyurethane foams of the present invention can be prepared by ring-opening an epoxidized natural oil. In many embodiments, the ring-opening is conducted using a reaction mixture comprising: (1) an epoxidized natural oil, (2) a ring-opening acid catalyst, and (3) a ring-opener. Also useful in making the polyurethane foams of the invention are the modified vegetable oil-based polyols reported in WO 2006/012344A1 (Petrovic et al.) and in WO 2006/116456 A1 (Abraham et al). A wide range of different lipid-based polyols can be formed with different hydroxyl numbers reactivity and functionality characteristics, by varying the reaction conditions of the manufacturing process or changing the technology route used. Lipid-based polyols with different characteristics are required by the different Urethane environments in which the polyols are is utilised. For example, and without restriction, a lipid-based polyol of relatively high functionality of about 4 but better still, 5 or 6 and with an hydroxyl number of 200 mg KOH/gramme to 250 or even 500 may be suitable for rigid foams or semi rigid foams whereas an hydroxyl number near to 56 and a functionality around 1.5 to 2 but better still in the range 2.0 to 2.5 and 2.5 to 3.5 or more or 3.5 to 7 or more, may be more appropriate to produce a flexible or semi flexible foam. See Low Cost Polyols from Natural Oils by B G Colvin of Envirofoam Chemicals Limited, part of the IFS Chemical Group, Roydon, Kings Lynn, England, and presented to Utech Asia 1995 as a Paper, see pages 1 to 9.

Examples of natural oils include plant-based oils (e.g., vegetable oils) although animal fats (such as lard and tallow) and fish oils can also be used. Examples of plant-based oils include soybean oil, safflower oil, linseed oil, corn oil, sunflower oil, olive oil, canola oil, sesame oil, cottonseed oil, palm-based oils, rapeseed oil, tung oil, peanut oil, saw grass and combinations thereof. The plant-based oils may be natural or genetically modified vegetable oils, for example, high oleic safflower oil, high oleic soybean oil, high oleic peanut oil, high oleic sunflower oil, and high erucic rapeseed oil (crambe oil).

Useful natural oils comprise triglycerides of fatty acids. The fatty acids may be saturated or unsaturated and may contain chain lengths ranging from about C 12 to about C24. Unsaturated fatty acids include monounsaturated and polyunsaturated fatty acids. Common saturated fatty acids include lauric acid (dodecanoic acid), myristic acid (tetradecanoic acid), palmitic acid (hexadecanoic acid), steric acid (octadecanoic acid), arachidic acid (eicosanoic acid), and lignoceric acid (tetracosanoic acid). Common monounsaturated fatty acids include palmitoleic (a C16 unsaturated acid) and oleic (a C18 unsaturated acid). Common polyunsaturated fatty acids include linoleic acid (a C18 di-unsaturated acid), linolenic acid (a C18 tri-unsaturated acid), and arachidonic acid (a C20 tetra-unsaturated acid). The triglyceride oils are made up of esters of fatty acids in random placement onto the three sites of the trifunctional glycerine molecule. Different vegetable oils will have different ratios of these fatty acids. The ratio of fatty acid for a given vegetable oil will also vary depending upon such factors, for example, as where the crop is grown, maturity of the crop, weather during the growing season, etc. Because of this it is difficult to provide a specific or unique composition for any given vegetable oil; composition is typically reported as a statistical average. For example, soybean oil contains a mixture of stearic acid, oleic acid, linoleic acid, and linolenic acid in the ratio of about 15:24:50:11. This translates into an average molecular weight of about 800-860 grams/mole, an average number of double bonds of about 4.4 to about 4.7 per triglyceride, and an iodine value of about 120 to about 140.

By way of example the natural oil used to make the lipid-based polyol can be a palm-based oil. As used herein "palm-based oil" refers to an oil or oil fraction obtained from the mesocarp and/or kernel of the fruit of the oil palm tree. Palm-based oils include palm oil, palm olein, palm stearin, palm kernel oil, palm kernel olein, palm kernel stearin, and mixtures thereof. Palm-based oils may be crude, refined, degummed, bleached, deodorized, fractionated, or crystallized. In many embodiments, the palm-based oils are refined, bleached, and deodorized (i.e., an "RBD" oil).

Isocyanate modified polyols according to the invention may be storage stable materials made by reaction of the isocyanate and the polyol wholly or substantially in the absence of water. The isocyanate modified polyol is pre-prepared and foamed, by exposure to the reaction of isocyanate and a foaming agent which is preferably water producing carbon dioxide, in a subsequent stage and this stage may be performed shortly after production of the isocyanate modified polyol in the same or different apparatus, or in the case of storage stable isocyanate modified polyol which is made or supplied wholly separately, on a subsequent occasion using different apparatus as required.

As used herein the term isocyanate modified polyol covers urethane-modified polyol (or prepolymer), i.e. polymeric material produced by reaction of polyol with isocyanate having urethane linkages for use in the production of end-product polyurethane material. Also as used herein the reference to non-foamed isocyanate modified polyol means isocyanate modified polyol produced substantially without any foaming. In practice, foaming may occur to a trivial or insignificant extent due to unavoidable presence of traces of water, e.g. contained in the raw material polyol, which may react with the isocyanate. However, it is preferred that no water is purposefully or intentionally added in the production of the isocyanate modified polyol and reaction conditions and ingredients are selected to inhibit or minimise carbon dioxide production by isocyanate/water reaction, especially if the material is to be used to make microcellular foams.

It is also to be understood that the process of the invention may involve use of a single isocyanate modified polyol i.e. polymeric material obtained by reacting a single polyol with a single multifunctional isocyanate, or it may involve use of multiple isocyanate modified polyols made by reacting any number of polyols with any number of multifunctional isocyanates to give one or more complex multiple different isocyanate modified polyols and optionally one or more different polymers.

For example, a natural oil based polyol can be used to make a single isocyanate modified polyol for use in the inventive method. Alternatively, a natural oil based polyol and a further polyol can be used to form either multiple isocyanate modified polyols and optionally one or more copolymers. Mixtures of different natural oil based polyols may also be used and different metal catalysts combinations may also be used. The selection of different catalysts and at different use levels can be used to vary the properties of the isocyanate modified polyol obtained.

The isocyanate modified polyol may be formed by mixing a lipid-based polyol, or a mixture of one or more lipid-based polyols and/or one or more further polyols, with the isocyanate, or a mixture of isocyanates, and possibly in the presence of one or more other ingredients such as a catalyst(s) This mixing may be done in a batch process e.g. with stirring, or as a continuous process by feed through a mixing head or the like. Mixing may occur at ambient temperature and may be maintained for any suitable period of time e.g. 24 hours, although other temperatures and much shorter time periods of a few minutes or seconds or an hour may be used depending on the nature of the reactants and any other ingredients including the type and level of catalyst used.

The further polyol can be any kind of polyol. For example it can be a petrochemical, or crude oil, based polyol and these may be of any suitable kind or a lipid based polyol such as an NOP. Typically polyether and polyester polyols are used in the production of PU foam and in accordance with the present invention it is preferred that the further polyol comprises or is wholly or at least predominantly a polyether polyol. Where a polyether polyol is used this is may be any type of material which can be selected to give a satisfactory product and good processing characteristics so it may be wholly or predominantly propylene oxide (PO) derived, although ethylene oxide (EO) may also be used additionally to PO to give the polyol an end cap of ethylene oxide, or, a mix of ethylene or a mix of ethylene and propylene oxide (a so called hetero polyol) can be added to the architecture of the polyol to effect its reactivity and properties of the urethane material being produced. Block and random sequences of different alkylene oxides are also known to be polymerised onto the side of the polymer chains of natural oil based polyols. However it is also possible to use mixtures of polyether and polyester polyol. Suitable polyols may have an OH functionality of 2 to 6, particularly 2 to 4 and may have a molecular weight (MW) in the range say 400-10,000. Triols are particularly preferred although lower or higher functionality polyols may be used dependant on the desired properties of the end product for example rigid foams which normally require polyols with relatively low molecular weights but much higher functionalities.

Certain further polyols containing inbuilt catalysis may also be used; see Waddington and al. U.S. Pat. No. 6,762,274/Dow Chemical Company for example.

Examples of the polyether polyols that can be used according to the invention are described, for example, on pages 44-54 and 75-78 of the Plastics Manual, Volume 7, Polyurethanes, Becker/Braun, $2^{nd}$ edition, published by Carl Hanser Verlag and will include polyols which contain polymer dispersions (as are well known in the art), i.e. so called polymer polyols or polymer modified polyols (as described in the Polyurethane Handbook-Oertel, Second Edition, February 1993, Published by Hanser/Gardner Publications Inc, pages 23, 56, 85, 198, 219 and 221).

It should of course be noted that polymer polyols as described above are derived from crude oil via a petrochemical process, and are not based on natural oils. It will now be possible, through this invention, to make polymer polyols containing natural oil-based polyols by making the polymer dispersions in isocyanate modified polyols, acting as the carrier polyol, and made via this novel technique.

A preferred further crude oil based polyol is a triol which is a propylene oxide adduct of glycerine and has a molecular weight of the order of 3,000. Commercial examples are Voranol® 3008 (Dow Chemical Company), or DESMOPHEN® 20WB56 (Bayer), and Lupranol 4070 from BASF AG. Other polyols which contain amounts of ethylene oxide may also be used for example the hetero polyol Pluracol 1388 from BASF Corporation, USA which has a molecular weight of approximately 3000 and an hydroxyl number of 56. This polyol has now been manufactured using Double Metal Catalysis and is available under the trade name of Pluracol 4156 from BASF Corporation, USA Their use is interchangeable in the invention.

Polymer polyols (also known as polymer modified polyols) are manufactured by forming a solid or out of phase liquid dispersion dispersion in a base, or "carrier polyol", in a manner such that there is substantially no chemical reaction between the base, carrier, polyol and the dispersed liquid polymer or solid. The dispersed liquid or solid polymer phase is normally formed within the carrier polyol and not merely dispersed physically into the carrier polyol. Relatively high molecular weight polyether polyol triols with molecular weights of between 4000 to 7000 with large end caps of 14 to 30% or more of ethylene oxide may be used with one or more natural oil-based polyols, according to the invention, as the diluent or carrier polyol, to make polymer modified polyols, described in the invention. Another aspect of the technology therefore is to form a polymer polyol material such as described in U.S. Pat. No. 4,374,209 by isocyanate modified natural oil-based polyol or combinations of natural oil-based polyols and petrochemical polyols, as described in the present invention, and using this isocyanate modified polyol as the carrier polyol for the manufacture of a polymer polyol. It may also be useful to make a isocyanate modified polyol using a polymer polyol such as described in U.S. Pat. No. 4,374,209 and a natural oil-based polyol or natural oil-based polyol/petrochemical polyol mixture as the carrier polyol component in U.S. Pat. No. 4,374,209 to produce a isocyanate modified polyol for the present invention. This material may be useful in making HR (High Resilience) and High Load Bearing foams. Carrier polyols prepared in the above manner may be useful in the manufacture of PHD from Bayer AG, PIPA from Shell Chemicals and "Copolymer Polyols" from Bayer Materials Science AG which are typically made incorporating polyurea, adducted triethanolamine and, acrylonitile and or styrene species as are all known in the art.

The relative proportions of the polyol and isocyanate which react to form the isocyanate modified polyol, and the MW (molecular weight) of the polyol, may be selected as required. The proportion of the isocyanate may be 0.01-99% of that required theoretically for reaction with all available OH groups, preferably 0.01 to 70% or 60% or 50%, preferably 0.01 to 33%, more preferably 0.01 to 30%, more preferably 0.1 to 30%, more preferably 3% to 25% or 30%. Low functionality NOPs such as palm oil are particularly suitable for high reaction percentages. Viscosity increases with proportion of isocyanate and the upper limit will depend on handling requirements. The proportion of available OH groups needing to be reacted according to the invention may depend on the relative differences between the functionalities of the NOPs and the crude oil based polyols present; with more OH groups needing to be reacted as the gap between the two functionalities widen. Palm oil polyols, with functionalities around 1.5 may benefit from higher stiochiometric reaction with isocyanate compared to for example Soy based polyols with OH functionalities of between 2 and 3 being reacted with isocyanate according the invention, in a mixture containing a crude oil based polyol with a functionality of about 3.

In practice the hydroxyl number of the isocyanate modified polyol can be determined from the relationship $$OH(\text{Isocyanate modified polyol}) = OH(\text{Polyol}) = \frac{php(\text{NCO}) \times 561}{EW(\text{NCO})}$$

OH(Polyol) is the hydroxyl number of the diluent or co polyol in the NOP mixture may be typically 56.

php(NCO) is the proportion of NCO as parts by weight per hundred parts of polyol, and EW(NCO) is the equivalent weight of the isocyanate which is 87 for TDI (i.e. molecular weight divided by theoretical functionality).

The use of PU gelation catalysts enables the production of much lower viscosity isocyanate modified polyols than would be the case if for example heat and or pressure are used wholly or partly to drive the OH isocyanate reaction. One of the outcomes and aims of the invention therefore is to minimise the viscosity increase of the isocyanate modified polyol component formed, and therefore minimise the viscosity of the foam forming formulation in general. This is because lower viscosity polyol materials, under say 8,000 but better still under 3,000 mPa·s, tend to have easier processing characteristics in continuous foam production, although higher viscosities of say up to 20,000 mPa·s may be used. All viscosity measurements (in mPa·s) are obtained using a Brookfield Viscometer. Unless otherwise stated viscosity is measured at 25 degrees C.

The proportion of isocyanate used in the manufacture of the lipid-based polyol-containing isocyanate modified polyol, or the isocyanate modified polyol used as a diluent prior to the foam manufacturing step, will have an effect on the physical properties of the foam or product, ultimately produced, for example, the foam's hardness, density, mechanical physical properties and compression sets. Higher proportions of isocyanate in the isocyanate modified polyol will also give foam with for example higher hardness (load bearing properties). The type of isocyanate chosen will also have an effect on the residual odour of the isocyanate modified polyol and therefore on the odour of the foam thus produced. Level and type of catalyst used will also effect the viscosity of the system and the reactivity and the finished material's characteristics including odour.

Isocyanates can be used to reduce the odour of a isocyanate modified polyol and/or foam especially if made from natural oil-based polyols. Isocyanate modified polyols based on the relatively more reactive TDI generally show lower odour characteristics compared to MDI based isocyanate modified polyols. Thus it is preferable to use TDI as the multifunctional isocyanate, particularly in order to reduce the odour of isocyanate modified polyols and/or foams made with or without natural oil-based polyols being present. Preferably TDI is used in amounts of between 0.01% (or 0.1%) to 99%, preferably 10/20/30/33/40/50% to 99% of the stoichiometric amount required to react with all the hydroxyl groups of the lipid-based polyol and or crude oil based polyol (NOP or otherwise) present, most preferably 1% to 99% or more than 0.1 php (parts per hundred parts of polyol, by weight). Preferably a catalyst is also used as it is believed that the catalyst further enhances the odour reducing effects. Catalysts which are a metal salt of an organic acid having no metal-carbon bonds are preferred, such as a catalyst of the formula $M(O.CO.R.CH_3)_2$ wherein M is a metal (preferably tin or zinc) and R is a carbon chain such as ricinoleate.

Preferably catalysts having a long carbon chain are used, for example at least 6 carbon atoms, more preferably 6-20 carbon atoms. Most preferably at least 12 carbon atoms are present in the chain, eg 12-20 carbon atoms. Side groups such as hydroxyls, double bonds or carbonyls are preferred to facilitate attachment of the odorous compounds, covalently, by complexation or by hydrogen bonding.

As an example, the catalyst can be a metal salt of a monohydroxy fatty acid, such as a metal ricinoleate salt. Preferred examples are tin and zinc diricinoleate, and also their Ca and Na salts. Alternative suitable catalysts include stannous dilaurate, stannous dipalmitate, stannous distearate, stannous dioleate, zinc dineodecanoate, and bismuth trineodecanoate.

The above-mentioned catalysts are preferred for their odour reducing effects. Whilst not wishing to be bound by theory, it is believed that the catalyst may be part of a structure that complexes or embeds the odorous compounds.

The amount of catalyst is preferably at least 0.001 mMoles/100 g polyol, preferably 0.001-0.1 mMoles/100 g polyol, although lower and higher levels may also be used as discussed below. Alternatively the amount of catalyst is at least 0.001 php, preferably 0.001-0.75 php by weight, in order to achieve optimum odour reducing effects. It is to be noted that the catalyst used to achieve odour reduction can be the same as, or different to any catalyst used in forming a isocyanate modified polyol. The level of the catalyst may also be the same or higher than that needed to make the isocyanate modified polyol even to the level required to make the eventual foam. If the same catalyst is used for odour formation and subsequent isocyanate modified polyol formation or for odour reduction, subsequent isocyanate modified polyol formation and subsequent foam formation, then the catalyst level may be added at the odour reduction stage at the level required in the final foam formation reaction, in which case no further catalyst will need to be added during the isocyanate modified polyol formation and foam formation or final production stage. Typical catalyst levels would therefore be 0.001 php to 0.75 php but levels outside these areas may be useful provided that the processability of the foam or urethane material at the final manufacturing stage is satisfactory. Normally the amount of catalyst added for odour reduction only, would be the minimum to attain the effect. By minimizing the catalyst level at this or any isocyanate modified polyol reaction stage before the urethane product is finally made gives maximum amount of formulating flexibility and freedom to subsequent stages, thus enabling different catalysts be chosen and used at various levels for example during the subsequent isocyanate modified polyol formation and foaming or other production step. Excessive levels of one catalyst at any one stage can for example affect the processability of the eventual foam, perhaps for example giving too quick or too slow reactivity, or too many or too few open cells. Also using different catalysts during different stages, odour reduction or isocyanate modified polyol formation, may build up to give undesirable foam reactivity profiles or foam properties, as mentioned here, or there may be reactivities or physical interactions between catalysts which will also cause the above problems during the manufacture of the foam, coating or adhesive or the final physical properties of the foam or urethane material produced.

By way of clarification, a PU gelation catalyst or catalysts may be included to perform one or more of the following functions: deodourisation, catalysis of the isocyanate modified polyol reaction, catalysis of the foam-forming reaction (as discussed further below). The same or different PU gelation catalysts may be used for these functions. The amount of catalyst used for the deodourisation and/or for the isocyanate modified polyol reaction may be in total within the range 0.0001 php to 1.0 php, (expressed as parts per hundred by weight of the pure catalyst component relative to the total polyol component) preferably 0.001 to 0.75 php by weight (expressed as parts per hundred by weight of the pure catalyst component relative to the total polyol component), although amounts above and below these limits may also be useful. Where used, the PU gelation catalyst for the foaming step may be additional to, or included in the foregoing range.

If the only intention of making the lipid-based isocyanate modified polyol is to reduce its odour then, very low amounts of a suitably reactive isocyanate preferably in the presence of a catalyst, may be used for example between 0.01% (or 0.1%) and 1% of the stoichiometric requirement although amounts up to 5/10/12/25/35% may also be used. It is not necessary to always use a refined isocyanate material if the sole objective is to eliminate odour of NOP polyols. A crude isocyanate stream but which is sufficiently reactive with the odour containing component will suffice to remove or reduce the odour causing components. The odour may be removed in one isocyanate modified polyol forming step and the formation of the isocyanate modified polyol required for foaming may take place using an alternative isocyanate at a later stage.

Foam odour is very important especially when the foam is used in automobiles where the foam part is in a confined, air locked environment and subject to heating for example via solar gain. It is also important when the finished foam is used in bedding, for pillows and mattresses, where a person's face comes into prolonged contact with the material. Every attempt is therefore made to reduce odour from foams and urethane products in general, for these reasons. The elimination or reduction of the odour of foam containing natural oil-based polyol materials as seen in this invention is unexpected and novel, and is not anticipated in the prior art.

It is also possible to remove or reduce the odour of polyols by using the invention as part of the crude oil based polyol process or the NOP production process. The NOP manufacturing process may involve spraying the stream, perhaps after heating, into a chamber or vessel which is under some degree of vacuum. The intention is to flash off some of the lighter components to further purify the or NOP of excess solvents including products formed during the reaction, or those added to the reaction as part of the NOP production process. Some of these materials removed will be high volatile materials which may contribute to the odour of the finished NOP. Ricinoleic acid, and/or one of its metal salts, preferably Zn, Sn, Na or Ca may be thus injected into this same vacuum space or added as a dispersed component of the liquid NOP input stream. Odour-reducing/eliminating additives, particularly ricinoleic acid or its salts may be incorporated at any suitable stage and in any suitable manner in the production of isocyanate modified polyol (or indeed any other polyol) or PU foam made therewith in accordance with the invention. Ricinoleic acid has been found to be a particularly effective deodorant. Where the additive is also a PU gelation catalyst, such as a ricinoleate salt, the additive may be used as the (or one) PU gelation catalyst for the isocyanate modified polyol or foam-forming method or, alternatively it may be used only as an odour-reducing/eliminating additive.

Also, alternatively, a diisocyanate, preferably TDI in combination with the ricinoleate acid or its metal salt may be introduced to make a make an airborne isocyanate modified polyol and remove or lessen the odour of the exiting NOP. The TDI may also be a reactant in the isocyanate modified polyol or foam-forming method or, alternatively it may be used only as an odour-reducing/eliminating additive. This technique of odour reduction during the actual polyol manufacture applies also to the production process of crude oil based polyols.

As mentioned, the deodourising effect of the invention may find application in polyols other than lipid-based polyols, and the combination of ricinoleic acid and/or ricinoleate salts with TDI may be particularly effective for such other polyols. Ricinoleic acid can be particularly effective for deodourisation. Ricinoleic acid where used (for lipid-based or other polyols) may be within the range 0.0001 php to 1.0 php, preferably 0.001 php to 0.75 php preferably 0.1 php to 0.5 php by weight, although amounts above and below these limits may also be useful. Ricinoleic acid may be incorporated solely for deodourisation, not for catalysis, whereby it may be accompanied by one or more PU gelation catalysts outside the above range for the acid The level at which these materials are used to reduce the odour from the NOP production process will depend on the type and degree to which the various odour forming materials are present. Sufficient can be added to have a sufficient effect, however use levels from 1% of the total crude oil based stream or natural oil polyol stream down to a level of 5 ppm may be used. But use levels outside this range may be necessary. Some of the odour forming materials have extremely low olfactory detection limits (smell thresholds). For example some of the aldehydes which may be present eg nonanal, can be detected by about 90% of humans at about 2 ppb (parts per billion) so, only very low level of the ricinoleate compound(s) will be needed to be added or sprayed into the production environment to eliminate the odour. TDI or other diisocyanate may also be introduced into the production stream at the same time as the ricinoleate material in order to boost the action of the ricinoleate salt in its deodourising and also thereby make an NOP based isocyanate modified polyol with its inherent benefits discussed herein.

See WO 2006/116456 Abraham et al, for a discussion on the levels of various odourous materials found after the production of NOPs.

Average functionality of the NOP and other polyols present may vary from less than 1.5 to 2 and from 2 to 6 especially 2 to 4 or especially 4 to 7 or more, dependant on the end use to be attained. NOPs have multiple hydroxyl reaction sites and the oligomers are capable of becoming "associated" or form dimers and trimers, and so a given NOP may be therefore useable in both rigid and flexible formulations.

The Viscosity is mainly determined by the proportion of isocyanate used, relative to the theoretical amount of isocyanate by weight required to react with all available hydroxyl groups of the polyol, and also by the original viscosity and type of the polyol or polyols mixture used to form the isocyanate modified polyol and the type and level of catalysis used to drive the isocyanate hydroxyl group reaction. Overall, as mentioned, the proportion may be 0.01 (but especially 0.1%) to 99%. The low viscosity isocyanate modified polyol may correspond to 0.01% (or 0.1%) to 30% or alternatively 0.01% (or 0.1%) to 23% or 25% or 33% of the required isocyanate particularly 0.01 (or 0.1%) to 12%, e.g. 3% to 12% whereas the high viscosity isocyanate modified polyol may correspond to 30% to 99%, particularly 30% to 50%.

Any suitable PU gelation catalysts may be used for the isocyanate addition reaction of the isocyanate modified polyol method, in particular for its initiation and/or promotion. Strong PU gelation catalysts are preferred. Suitable gelation catalysts include tin compounds, such as stannous dioctoate, dibutyltin dilaurate or tertiary amines such as 1,4-diaza(2,2,2)bicyclooctane, or other substances which are used in the art, such as Zinc Octoate, etc. Where necessary, two or more different catalysts may also be used simultaneously. Other catalysts which are useful are Bismuth based catalysts (eg from Shepherd Chemical Company of Ohio, USA) or Kosmos EF and Kosmos 54 and similar materials (from Evonik of Essen, Germany) based on ricinoleate and also materials as described in PCT/EP2008/002282 and in U.S. Pat. No. 6,194,475 B1 (Boinowitz et al.). Preferably, no heating or applied pressure is used to initiate the reaction nor to promote the reaction, as this is safer and cheaper. Also the use of heat will tend to promote the isocyanate-hydroxyl reactions in all of the lipids present and lead to an indiscriminately highly cross linked polymer with much higher viscosity than would be the case when PU gelation, particularly metallic, catalysts are used. Heat is an indiscriminate catalyst especially undesirable in a promoting reaction in a system, such as this one, with a wide variety of different polymer chain lengths, and activities, present. Using heat as a catalyst also leads to the antioxidant, added to the NOP and crude oil polyols after manufacture to prevent scorch and auto ignition of the finished PU foam, being partly consumed. So the use of heat as a catalysis requires replacement of the antioxidant consumed, which is not the case in the preferred embodiment of this invention when PU gelation catalysis, at normal temperatures, is used.

Any added PU gelation catalyst would typically be used in small quantities, e.g. of the order of 0.004% by weight for a tin salt such as dibutyl tin dilaurate, stannous octoate or higher homologues, although as mentioned other catalysts can also be used.

Other ingredients and additives include, in particular, auxiliary agents such as chain extending agents, cross-linking agents and chain terminators.

With regard to the multifunctional isocyanate this is preferably a diisocyanate, more preferably an aromatic diisocyanate, particularly TDI (toluene diisocyanate). However other multifunctional isocyanates, preferably having a functionality of 2 to 5 may be used alone or in any suitable combination. The same isocyanate may be used both in the production of the isocyanate modified polyol and in the subsequent production of the foam, or different isocyanates may be used.

Thus the multifunctional isocyanate may be any one or more of:

TDI (all isomer blends of toluene diisocyanate),
MDI (methylene diphenyl isocyanate),
Which may be pure or polymeric versions (so called aromatic isocyanates).

More particularly, the multifunctional isocyanate is a polyisocyanate containing two or more isocyanate groups and standard commercial di- and/or triisocyanates are typically used. Examples of suitable ones are aliphatic, cycloaliphatic, arylaliphatic and/or aromatic isocyanates, such as the commercially available mixtures of 2,4- and 2,6-isomers of diisocyanatotoluene (=tolylenediisocyanate TDI), which are marketed under the trade names Caradate® T80 (Shell) or Voranate® T80 and T65 (Dow Chemicals). 4,4'-diisocyanatodiphenylmethane (=4,4'-methylenebis(phenylisocyanate); MDI) and mixtures of TDI and MDI can also be used. It is also possible, however to use isocyanate modified polyols based on TDI or MDI and polyols. Modified or mixed isocyanates (for example Desmodur® MT58 from Bayer) may also be used. Examples of aliphatic isocyanates are 1,6-hexamethylene diisocyanates or triisocyanates such as Desmodur® N100 or N3300 from Bayer.

The isocyanate is preferably present in an amount of up to 33% or 50%, preferably up to 30% (or otherwise as discussed above) of that required to react with the polyol hydroxyls and all other hydroxyls present in the polyol mixture.

Isocyanate-reactive, monofunctional compounds, such as monohydric alcohols, primary and secondary amines, may be used as chain terminators.

Yet further auxiliary agents known in the art, such as non reactive flame retardants, emolliants or pigments or fillers may also be added.

The isocyanate modified polyol may incorporate or, prior to foaming may be mixed with other substances. For example, unreacted polyol of the same or different kind may be added e.g. to dilute the isocyanate modified polyol to give a lower viscosity or to modify reactivity of the system or the properties of the resulting foam.

The isocyanate modified polyol may be foamed in conventional manner using conventional devices, for example those which are described on pages 171-178 of the Plastics Manual, Volume 7, Polyurethanes, Becker/Braun, $2^{nd}$ edition, published by Carl Hanser Verlag, and using conventional foam formulations, such as those described, for example, on pages 187-193 of the Plastics Manual, Volume 7, Polyurethanes, Becker/Braun, $2^{nd}$ edition, published by Carl Hanser Verlag.

Typically, for foam production, the isocyanate modified polyol will be mixed with water and/or other volatile blowing agent, isocyanate, one or more catalysts, and one or more other ingredients such as a foam stabiliser.

Foaming may be on a batch or continuous basis and the mixture may be gassed with nitrogen or other inert gas known in the art.

In more detail, the foaming ingredients may comprise one or more of:

a) Isocyanates, such as aliphatic, cycloaliphatic, arylaliphatic and/or aromatic isocyanates. Examples are commercially available compounds of 2,4- and 2,6-isomers of di-isocyanatotoluene (=tolylenediisocyanate TDI). Trade names are Caradate® T80 from Shell, Voranate® T80 and T65 from Dow Chemical. It is also possible to use 4,4'-diisocyanato-diphenylmethane (=4,4'-methylenebis(phenylisocyanate); MDI) and mixtures of MDI and TDI.

Furthermore isocyanate modified polyols, which are isocyanate terminated and based on TDI or MDI and polyols may also be used. A further possibility would be modified or mixed isocyanates (e.g. Desmodur® MT58 from Bayer). Examples of aliphatic isocyanates are 1,6-hexamethylene diisocyanates or triisocyanates, e.g. Desmodur® N100 or N3300 from Bayer.

The isocyanate(s) may be the same as or different from the isocyanate(s) package used to make the isocyanate modified polyol b) Water, preferably 0.5 to 10 parts by weight to one hundred parts of polyol or isocyanate modified polyol or polyol/isocyanate modified polyol mixture by weight. Although levels outside these limits may be used for example at over 10 parts by weight in the manufacture of rigid foams manufactured and dispensed via a spray gun c) Liquid pentane also acetone and other materials known in the art can also be used as additional blowing agents d) Other additives may also optionally be used, particularly those well known in the PU foaming art, such as catalysts, in particular an amine, such as DMEA (dimethyl ethanolamine), DABCO® 33 LV (a tertiary amine from Air Products), and/or a metallo-organic compounds such as a tin catalyst e.g. Kosmos 29 (dibutyl tin laurate), Kosmos 19 (stannous octoate) both from Evonik Goldschmidt of Essen Germany, bismuth based catalysts or other catalysts such as zinc octoate; foam stabilizers known in the art, for example silicone surfactant such as from the Tegostab® range from Evonik Goldschmidt or the Silbyk® range from BYK-Chemie; chain extending agents and/or cross-linking agents, such as diethanolamine, glycerine, sorbitol which are can be incorporated to eliminate splits and aid processing as is known in the art; as well as flame retardants; fillers. Using the same gelation catalyst at the isocyanate modified polyol formation stage and the foam formation stage will further increase the stability, processing safety, physical properties and flammability properties of the final foam produced (eg use Kosmos EF to make the isocyanate modified polyol(s) and also as a gelation catalyst in the foam forming reaction, in which case a degree of odour reduction of the foam will be obtained if, for example, TDI has been used as the isocyanate to make the foam). Those additives and others known in the art in relation to conventional foaming processes may be used in any combination.

e) Nitrogen for gassing and controlling the cell structure (size and size distribution).

f) Injecting liquid carbon dioxide and/or other gases is also a well known method of controlling density and cell size in foam manufacture.

For foaming, it is also possible, where necessary, to work under a reduced or excess pressure; processing conditions for this are disclosed, for example, in U.S. Pat. No. 5,194,453.

If a gas is needed in the production process it is preferably nitrogen or air or carbon dioxide that may be used.

In addition to the isocyanate modified polyol, mixtures of isocyanate modified polyol with either polyether polyol and/or with polyester polyol or other polyols may also be used here.

In order to better illustrate the invention, it will be further explained below with reference to examples.

EXAMPLES

Comparative Example 1 is a prior art isocyanate modified polyol made in accordance with the process disclosed in PCT/EP 2005/005314, Example P see pages 27 and 29 (Fritz Nauer) but using a different gelation catalyst. Invention examples 2-10, although again using a different catalyst, are isocyanate modified polyols for use in the present invention, which have been made via a similar process to Comparative Example 1. Example 11 represents a pure natural oil-based polyol. All amounts are in parts by weight to 3 significant figures, and various physical properties are shown.

|  | Ex 1 (Comparative) | Ex 2 | Ex 3 | Ex 4 | Ex 5 | Ex 6 |
|---|---|---|---|---|---|---|
| L 4070 (pbw) | 99.0 |  |  | 49.0 |  | 49.4 |
| Green A (pbw) |  | 99.0 |  |  |  |  |
| Green B (pbw) |  |  | 99.0 | 50.1 |  |  |
| Green C (pbw) |  |  |  |  | 99.0 | 50.2 |

-continued

|  | Ex 1 (Comparative) | Ex 2 | Ex 3 | Ex 4 | Ex 5 | Ex 6 |
|---|---|---|---|---|---|---|
| M220 (pbw) | 1.00 | 1.01 | 1.02 | 1.00 | 1.08 | 1.06 |
| Kosmos EF (pbw) | 0.003 | 0.003 | 0.003 | 0.003 | 0.003 | 0.003 |
| Hydroxyl number | 51 | 45 | 51 | 51 | 145 | 99 |
| Viscosity (m·Pa·s at 25 Deg C.) |  | 1320 | 5800 | 2120 | 1320 | 2130 |
| Smell |  | None | slight oily | slight oily | slight alcohol | slight alcohol |
| Percent of OH groups reacted | 8.3 | 9.5 | 8.5 | 8.3 | 3.2 | 9.0 |

GreenA is a castor oil based polyol (Lupranol Balance 50) sold by BASF with a natural oil content of approx. 31%. The remainder being the propylene oxide and ethylene oxide which have been adducted onto the castor oil starting material. It has an Hydroxyl number of 50.

GreenB is a soybean based polyol (BiOH 5000) made by Cargill Inc. It has an Hydroxyl number of 56.

GreenC is a mesocarp palm oil based polyol (F6012) made by PolyGreen Chemicals (Malaysia) Sdn. Bhd of Kuala Lumpur, Malaysia. It has an Hydroxyl number of 158.

GreenD is a Soy based polyol called Soyol D09004 Lot P090203 from United Soy Systems Company of Volga, S. Dak. USA. Hydroxyl value was 71.

GreenE is a Soy based polyol called Soyol 2101 from United Soy Systems Company of Volga, S. Dak. USA hydroxyl value was 66.

GreenF is Enviropol R201 and is an NOP based on Rape seed oil from IFS chemical Group of Roydon, Kings Lynn, England, with an hydroxyl value of 500

Lupranol 4070, is a trifunctional polyol with glycerol starter and propylene oxide backbone with a propylene oxide tip is from BASF AG of Ludwigshafen, Germany. It has a molecular weight of 3000 and a hydroxyl number of 56.

Pluracol 1388 (also labelled as Pluracol 4156, which is the DMC variant of 1388) is a trifunctional polyol from BASF Corporation, USA. It has a molecular weight of approx 3000 and a hydroxyl number of 56. It is a "hetero polyol" ie it has a random distribution of ethylene and propylene oxide at the end tip of the molecular chains.

Voranol RA 800 is polyether polyol made by Dow Chemical Company and has an hydroxyl value of 780 to 820 and finds use in rigid urethane foam formulations.

Voranol CP 450 is a rigid polyol from Dow Chemical Company with an hydroxyl value of 400

B1048 is a rigid foam silicone stabilizer from Evonik GmbH of Essen, Germany.

BF2370 is a silicone surfactant from Evonik GmbH of Essen Germany

BF8232 is a silicone surfactant from Evonik GmbH of Essen Germany

The Tegoamin PMDETA and Tegoamin DMCHA are both amine catalysts from Evonik Goldschmidt of Essen, Germany Blowing agent Solkane 365/227 is from the Solvay Fluor Company of Hannover, Germany Voranate M220 is an polymeric MDI produced by Dow Chemical Company Wannate PM220 is a polymeric MDI is from Yantai Wanhua, Yantai, Shangdong, P R China.

TCCP is Fyrol PCF from Supresta Inc of the USA

Dabco is DABCO® 33LV (a tertiary amine from Air Products)

A1 is Niax A1 and is an amine catalyst from Air Products

Sn Oct 33% is Kosmos 19 from Evonik GmbH of Essen Germany and is a solution of 33% Stannous Octoate in a carrier solvent.

DEOA 90% is a solution of 90 parts of Diethanolamine in 10 parts of water

Kosmos EF is a catalyst comprising Tin Ricinoleate and produced by Evonik AG of Essen Germany Kosmos 54 is a catalyst comprising Zinc Ricinoleate and produced by Evonik AG of Essen Germany Dibutyltindilaurate (DBTL) is available from the Sigma-Aldrich Company, Dorset, UK Ricinoleic Acid was from Sigma-Aldrich Company, Dorset, UK.

| Parts by weight pbw | Ex 1 Comparative | Ex 7 | Ex 8 | Ex 9 | Ex 10 | Ex 11 | Ex 12 | Ex13 | Ex 14 |
|---|---|---|---|---|---|---|---|---|---|
| L 4070 | 99.0 |  | 99.0 |  | 97.0 |  |  |  |  |
| GreenB |  | 99.0 |  | 99.0 |  | 100 | 99.0 | 99.0 | 99 |
| M220 | 1.00 |  |  | 1.00 |  |  |  |  |  |
| Kosmos EF | 0.003 | 0.003 | 0.003 | 0.003 | 0.003 |  |  |  |  |
| Kosmos 54 |  |  |  |  |  |  | 0.003 |  |  |
| DBTL |  |  |  |  |  |  |  | 0.003 |  |
| Sn Oct33% |  |  |  |  |  |  |  |  | 0.03 |
| TDI |  | 1.0 | 1.0 |  | 3.0 |  | 1.0 | 1.0 | 0.4 |
| Smell BMW test VDA 270 |  |  |  |  |  |  |  |  |  |

-continued

| Parts by weight pbw | Ex 1 Comparative | Ex 7 | Ex 8 | Ex 9 | Ex 10 | Ex 11 | Ex 12 | Ex13 | Ex 14 |
|---|---|---|---|---|---|---|---|---|---|
| Panellist 1 | 2 | 1 | 1 to 2 | 3 | 2 | 3 | 1 to 2 | 3 | 3 |
| Panellist 2 | 2 | 1 | 2 | 3 | 2 | 3 | 2 | 3 | 3 |
| Panellist 3 | 2 | 1 | 1 | 3 | 1 | 2 to 3 | 1 | 2 to 3 | 3 |
| Panellist 4 | 2 | 1 | 1 | 3 | 1 | 3 | 1 | 3 | 3 |
| Panellist 5 | 2 | 1 | 1 | 3 | 1 | 3 | 1 | 3 | 3 |

The BMW smell test is conducted according to protocol VDA 270/DIN 10955. In summary this means that each odour panellist rates the smell according to the following scale: 1=No smell (Kein); 2=Slight smell, inoffensive (Nicht Stoerend); 3=Easily detectable but bearable (Stoerend); 4=Uncomfortable smell (Stark Stoerend); 5=Very disturbing smell (Extrem); 6=Unbearable smell (Unertraeglich). As can be seen, Green B (shown in Example 11) has an odour of 3, or 2 to 3, as rated by all five panellists. When this natural oil-based polyol is made into the isocyanate modified polyol of Examples 7, 8, 10 and 12 (i.e. a isocyanate modified polyol comprising TDI) with the metal salts of ricinoleic acid as catalyst, the odour level is reduced. The use of an alternative metal catalyst DBTL even in combination with TDI, in Example 13, does not reduce the odour of GreenB. Using stannous octoate (Example 14) has an identical effect to using DBTL and similarly does not reduce odour. The isocyanate modified polyol of Example 9 (which contains no TDI) is not reduced as compared to the odour of Green B alone. Further, the isocyanate modified polyol of comparative Example 1 has on average a greater odour than the inventive isocyanate modified polyols of Examples 7, 8, 10 and 12 Identification and total removal, of odour forming species is very complex. A certain odour from one species may be masked by that of another in an Odour Panel test. So we have found that sometimes the odour of the NOP has been reduced by say a rating of 3, to 2, but the odour is reported as being totally changed from say an "acid" smell to a "sweet" one. In other words the isocyanate/catalyst pretreatment of the invention may remove a certain percentage of an Odour forming species, dependant on the amount of isocyanate and catalyst used and cause odour rating to drop from 3 to 2 or perhaps 1. It also may remove a species entirely but leave or reveal another species as the odour causing molecule or complex. In this fashion the rating may drop from 3 to 2 but with the Odour Panel reporting a "Different" smell at level 2.

| Parts by Weight pbw | Ex 15 | Ex 16 | Ex 17 | Ex 18 |
|---|---|---|---|---|
| GreenD | 100.0 | | 100.0 | |
| GreenE | | 100.0 | | 100 |
| Ricinoleic Acid | | | 0.1 | 0.1 |
| Smell BMW test VDA 270 | | | | |
| Panellist 1 | 3 | 3 | 2 | 2 |
| Panellist 4 | 3 | 3 | 2 | 2 |
| Panellist 5 | 3 | 3 | 2 | 2 |
| Panellist 6 | 3 | 3 | 2 | 2 |

Examples 14 to 17 show the effects of adding and mixing Ricinoleic Acid into various Soy polyols, GreenD and GreenE at room temperature of approximately 18 degrees centigrade and leaving the mixture to stand for 7 days.

The report from the Odour panel that the odour had lessened, shown by the lower scores after contact with the Ricinoleic Acid, and, also that the odour had "Changed in Character". The level of Ricinoleic acid may be varied sufficiently to remove the odours from say 0.01 php to 0.5 php. The upper limit and lower limits may vary dependant of the effect of that level of the acid at any level being present, on the processing characteristics of any subsequent Urethane reaction. No adverse flexible foam processing effects have been found with Ricinoleic acid levels of approx 0.5 php. The temperature and pressure or vacuum of the environment in which the Ricinoleate is contacted with the NOP before or during or after the NOP production process will have an effect on the speed and extent of the odour reduction attained.

Comparative Example A is a standard foam and comparative Examples B-D (shown below) are prior art foams made in accordance with the process described in Example P (see pages 27 & 29) of PCT/EP2005/005314 (Fritz Nauer) although using different catalysis. Examples E-Y and ZB-ZR (also shown below) are foams made to illustrate the method of the present invention. All amounts are in parts per hundred of total polyol (php) and various physical properties are also shown. Points of note with regard to various Inventive Examples are herein after highlighted:

Examples E and G contain Green B without containing any of the isocyanate modified polyols of Examples 1-6. They give less favourable stability (foam E collapses) or have foam with internal splits and G is very soft. Examples F, M, N and O, however, all contain at least one isocyanate modified polyol of Examples 1-6 and give good processing: all of these latter foams are harder than Example G and have better compression sets even at higher NOP inclusion levels than G. Foams F and G contain similar natural oil-based polyol (NOP) levels, but Foam F which contains the modified polyol of the invention is harder than Foam G. A comparison of Example H with I shows a similar improvement in processing by the combination of Green A with a isocyanate modified polyol in the formulation in formulation I compared to H. Comparison between H & J show the improvement in processing safety, and hardness when the NOP material is modified with the isocyanate before incorporation into the foam formulation.

Foam L can be compared to N. Foam L has less stability then N. Both contain identical levels of GreenB, but all the polyols present in Foam N have been subject to the isocyanate addition of the invention. Foam N has a higher hardness than Foam L. Likewise K and E can also be compared. Both are based on GreenB, but whereas Foam E collapsed, Foam K based on the same percentage of GreenB which had undergone the invention made a viable, stable foam in spite of the fact that it was very uncured and showed outward signs of inadequate cure under formulation regime chosen to investigate the NOPs in the invention. All foams in Examples A to ZF were made at approximately 3.35 php water and the TDI amount was held constant at approximately 47.5 php. This level of TDI represents a very high index of about 118, and as such was used to "stress" the processing of the example foams of the invention. In Examples ZJ and ZK, the TDI index was reduced to a less extreme level of 105. Foams O and R have similar NOP levels and the NOP and diluent polyols have been subject to the invention. Foam R contains a high level of a non reactive flame retardant compared to Foam O, it therefore has a lower hardness than O, as would be expected, but a surprisingly good Compression Set result. Normally the addition of flame retardant to urethane formulations leads to a worsening of Compression Set values.

Example Q is the same as Example G but with a non reactive flame retardant present. The foam has internal splits and is once again soft. The addition of isocyanate modified polyol as seen in Example R eliminates the splits, the foam is harder with improved elasticity and durability. Normally higher hardness is associated with a lowering of elasticity. The compression sets of Example R are still excellent especially compared to Example P which has a lower NOP level. Flammability is improved in all foam samples containing isocyanate modified polyol. All foam samples containing isocyanate modified GreenB compared to those incorporating unmodified GreenB, exhibited reduced odour in an ad hoc test. The odour of the NOP containing foams subjected to the invention have been substantially removed or reduced, but of course the normal "foam smell" of amine and unreacted carrier solvents which can be associated with some silicones and the degradation products of the stannous octoate used as the PU gelation catalyst, still remain whilst the foam is still relatively freshly made.

Examples S and H contain Green A without any of the pre-polymers of Examples 1-6. Foam S has a flame retardant added to the formulation compared to H. The compression sets are better in the formulation with the flame retardant present. Examples S & T are similar but in T Green A is present as a isocyanate modified polyol and makes the foam significantly harder than S, the presence of Green A as a isocyanate modified polyol improves the processing. In S & T a non reactive flame retardant is added compared to H. T which contains the isocyanate modified polyol is harder than S. Example U contains Green C without any isocyanate modified polyol. Example V shows the addition of isocyanate modified polyol at the same NOP content of 20 php without loss of physical properties whilst at the same time hardness is increased. Example W compared to X have similar differences in various physical properties including hardness through X containing the isocyanate modified polyol in comparison to W. Within experimental error, the compression sets of W and X are identical. Example Y shows the effect on partial substitution of isocyanate modified polyol in the formulation for standard polyol, on the foam hardness. In Example Y, the foam hardness lies between those of Examples W & X.

Examples ZB and ZC show the increase in foam hardness when the modified NOP is diluted with the isocyanate modified polyol of Example 1 compared to dilution with a conventional crude oil based polyol.

Example ZF shows a foam with an extremely high level, 65 php, of natural oil base polyols (made up of Castor Oil based and Soybean Oil polyols, both of which have undergone isocyanate modification of the invention) which processes safely into a stable foam. Example ZK shows the foam in Example ZJ but made with the addition of trace amounts Diethanolamine which is able to act as a weak processing aid and is commonly used to eliminate small instabilities and surface splits in flexible foam formulations. The processing of ZK is improved and the hardness is increased compared to ZJ.

|  | Ex A | Ex B | Ex C | Ex D |
| --- | --- | --- | --- | --- |
| L 4070 | 100.00 | 0.00 | 0.00 | 100.00 |
| Green A | 0.00 | 0.00 | 0.00 | 0.00 |
| Green B | 0.00 | 0.00 | 0.00 | 0.00 |
| Green C | 0.00 | 0.00 | 0.00 | 0.00 |
| Comparative Example 1 | 0.00 | 100.00 | 100.00 | 0.00 |
| Example 2 | 0.00 | 0.00 | 0.00 | 0.00 |
| Example 3 | 0.00 | 0.00 | 0.00 | 0.00 |
| Example 4 | 0.00 | 0.00 | 0.00 | 0.00 |
| Example 5 | 0.00 | 0.00 | 0.00 | 0.00 |
| Example 6 | 0.00 | 0.00 | 0.00 | 0.00 |
| TCCP | 0.00 | 0.00 | 10.10 | 10.25 |
| BF2370 | 0.80 | 0.81 | 0.00 | 0.00 |
| B8232 | 0.00 | 0.00 | 0.80 | 0.80 |
| Dabco | 0.20 | 0.21 | 0.21 | 0.22 |
| A1 | 0.09 | 0.11 | 0.09 | 0.11 |
| SnOct 33% | 0.38 | 0.34 | 0.40 | 0.40 |
| DEOA 90% | 0.00 | 0.00 | 0.00 | 0.00 |
| water add | 3.36 | 3.34 | 3.36 | 3.34 |
| water tot | 3.41 | 3.34 | 3.36 | 3.39 |
| TDI | 47.43 | 47.31 | 47.42 | 47.63 |
| index | 113.73 | 117.46 | 117.12 | 114.81 |
| cream rise | 10.00 | 11.00 | 11.00 | 10.00 |
| blow off | 0.06 | 0.06 | 0.06 | 0.07 |
|  | OK | good | good | weak |
| processing | good | good | good | good |
| Density | 26.75 | 27.95 | 32.00 | 30.10 |
| CLD 40% | 3.49 | 4.54 | 4.42 | 3.29 |
| Ball Rebound | 35.00 | 32.00 | 36.00 | 36.00 |
| CLD after HA | 2.51 | 2.99 |  |  |
| HALL % | 28.37 | 31.72 | 31.67 | 30.09 |
| afterflame time |  |  | >20 | >20 |
| Comp Set 75% | 4.30 | 6.50 | 2.80 | 2.50 |

|  | | | | |
|---|---|---|---|---|
| Hysteresis Loss | 31.50 | 34.00 | 32.80 | 31.60 |
| SAG | 2.21 | 2.40 | 2.40 | 2.43 |
| burn length | | | entirely | entirely |
| | | | entirely | entirely |
| | | | 20.00 | 50.00 |
| | | | 40.00 | 110.00 |
| | | | 70.00 | |
| Php Green component (approx) | Nil | Nil | Nil | Nil |

| | Ex E | Ex F | Ex G | Ex H | Ex I | Ex J | Ex K |
|---|---|---|---|---|---|---|---|
| L 4070 | 0.00 | 0.00 | 80.03 | 0.00 | 0.00 | 0.00 | 0.00 |
| Green A | 0.00 | 0.00 | 0.00 | 100.00 | 79.67 | 0.00 | 0.00 |
| Green B | 100.00 | 20.03 | 19.97 | 0.00 | 0.00 | 0.00 | 0.00 |
| Green C | 0.00 | 0.00 | 0.00 | 0.00 | 0.00 | 0.00 | 0.00 |
| Comparative Example 1 | 0.00 | 79.97 | 0.00 | 0.00 | 20.33 | 0.00 | 0.00 |
| Example 2 | 0.00 | 0.00 | 0.00 | 0.00 | 0.00 | 100.00 | 0.00 |
| Example 3 | 0.00 | 0.00 | 0.00 | 0.00 | 0.00 | 0.00 | 100.00 |
| Example 4 | 0.00 | 0.00 | 0.00 | 0.00 | 0.00 | 0.00 | 0.00 |
| Example 5 | 0.00 | 0.00 | 0.00 | 0.00 | 0.00 | 0.00 | 0.00 |
| Example 6 | 0.00 | 0.00 | 0.00 | 0.00 | 0.00 | 0.00 | 0.00 |
| TCCP | 0.00 | 0.00 | 0.00 | 0.00 | 0.00 | 0.00 | 0.00 |
| BF2370 | 0.80 | 0.80 | 0.80 | 0.79 | 0.79 | 0.79 | 0.78 |
| B8232 | 0.00 | 0.00 | 0.00 | 0.00 | 0.00 | 0.00 | 0.00 |
| Dabco | 0.20 | 0.19 | 0.20 | 0.20 | 0.20 | 0.19 | 0.21 |
| A1 | 0.10 | 0.09 | 0.11 | 0.10 | 0.09 | 0.10 | 0.10 |
| SnOct 33% | 0.35 | 0.40 | 0.34 | 0.42 | 0.41 | 0.35 | 0.45 |
| DEOA 90% | 0.00 | 0.00 | 0.00 | 0.00 | 0.00 | 0.00 | 0.00 |
| water add | 3.36 | 3.36 | 3.37 | 3.34 | 3.33 | 3.34 | 3.27 |
| water tot | 3.41 | 3.37 | 3.42 | 3.42 | 3.39 | 3.34 | 3.27 |
| TDI | 47.47 | 47.07 | 47.70 | 47.67 | 47.42 | 47.41 | 46.99 |
| index | 113.95 | 115.45 | 114.24 | 116.54 | 116.67 | 120.42 | 118.60 |
| cream rise | 11.00 | 12.00 | 12.00 | 11.00 | 12.00 | 11.00 | 30.00 |
| blow off | 0.07 | 0.06 | 0.07 | 0.06 | 0.06 | 0.06 | 0.10 |
| | Slow | weak | weak | weak | good | good | lack of curing |
| processing | Collapse | good | splits | good | good | good | lack of crosslink |
| Density | | 27.40 | 27.00 | 26.95 | 27.45 | 29.35 | 30.2 |
| CLD 40% | | 4.09 | 3.22 | 3.72 | 3.89 | 4.92 | |
| Ball Rebound | | 30.00 | 30.00 | 40.00 | 33.00 | 39.00 | |
| CLD after HA | | 3.24 | 2.53 | 2.85 | 2.87 | 3.55 | |
| HALL % afterflame time | | 28.12 | 25.78 | 23.39 | 27.51 | 27.03 | |
| Comp Set 75% | | 23.50 | 28.80 | 5.00 | 5.20 | 6.80 | |
| Hysteresis | | 38.10 | 37.20 | 33.40 | 33.10 | 35.00 | |
| SAG burn length | | 2.59 | 3.00 | | 2.28 | 2.47 | |
| Php Green component (approx) | 100 | 20 | 20 | 30 | 25 | 30 | 100 |

| | Ex L | Ex M | Ex N | Ex O | Ex P | Ex Q | Ex R |
|---|---|---|---|---|---|---|---|
| L 4070 | 49.83 | 72.10 | 0.00 | 49.93 | 0.00 | 80.03 | 49.72 |
| Green A | 0.00 | 0.00 | 0.00 | 0.00 | 0.00 | 0.00 | 0.00 |
| Green B | 0.00 | 0.00 | 0.00 | 0.00 | 19.89 | 19.97 | 0.00 |
| Green C | 0.00 | 0.00 | 0.00 | 0.00 | 0.00 | 0.00 | 0.00 |
| Comparative Example 1 | 0.00 | 0.00 | 0.00 | 0.00 | 80.11 | 0.00 | 0.00 |
| Example 2 | 0.00 | 0.00 | 0.00 | 0.00 | 0.00 | 0.00 | 0.00 |
| Example 3 | 50.17 | 27.90 | 0.00 | 0.00 | 0.00 | 0.00 | 0.00 |
| Example 4 | 0.00 | 0.00 | 100.00 | 50.07 | 0.00 | 0.00 | 50.28 |
| Example 5 | 0.00 | 0.00 | 0.00 | 0.00 | 0.00 | 0.00 | 0.00 |
| Example 6 | 0.00 | 0.00 | 0.00 | 0.00 | 0.00 | 0.00 | 0.00 |
| TCCP | 0.00 | 0.00 | 0.00 | 0.00 | 9.91 | 10.09 | 10.08 |
| BF2370 | 0.79 | 0.80 | 0.81 | 0.80 | 0.00 | 0.00 | 0.00 |
| BF8232 | 0.00 | 0.00 | 0.00 | 0.00 | 0.81 | 0.80 | 0.79 |
| Dabco 33LV | 0.20 | 0.20 | 0.25 | 0.20 | 0.20 | 0.22 | 0.21 |
| A1 | 0.10 | 0.10 | 0.10 | 0.10 | 0.11 | 0.10 | 0.11 |
| SnOct 33% | 0.45 | 0.45 | 0.45 | 0.44 | 0.44 | 0.40 | 0.42 |

-continued

|  |  |  |  |  |  |  |  |
|---|---|---|---|---|---|---|---|
| DEOA 90% | 0.00 | 0.00 | 0.00 | 0.00 | 0.00 | 0.00 | 0.00 |
| water add | 3.35 | 3.36 | 3.34 | 3.37 | 3.34 | 3.33 | 3.36 |
| water tot | 3.38 | 3.40 | 3.34 | 3.39 | 3.35 | 3.38 | 3.38 |
| TDI | 47.58 | 47.43 | 47.42 | 47.56 | 47.77 | 47.60 | 47.68 |
| index | 116.01 | 114.60 | 117.59 | 115.52 | 117.80 | 114.93 | 116.10 |
| cream rise | 15.00 | 11.00 | 13.00 | 12.00 | 11.00 | 11.00 | 11.00 |
| blow off | 0.08 | 0.06 | 0.07 | 0.06 | 0.07 | 0.08 | 0.07 |
| processing | settles splits | good (small) splits | settles (small) splits | good good | good good | weak splits | good good |
| Density | 27.30 | 27.00 | 27.90 | 27.35 | 30.45 | 29.60 | 30.00 |
| CLD 40% | 4.20 | 3.88 | 4.59 | 4.17 | 4.01 | 3.16 | 3.56 |
| Ball Rebound | 45.13 | 33.00 | 45.43 | 27.00 | 35.00 | 31.00 | 34.00 |
| CLD after HA | 3.22 |  |  | 3.13 |  |  |  |
| HALL % | 23.33 | 27.06 |  | 26.62 | 27.43 | 31.15 | 29.49 |
| afterflame time |  |  |  |  | 12.00 | >20 | 1.00 |
| Comp Set 75% | 65.3 | 15.10 | 25.20 | 27.40 | 27.40 |  | 5.20 |
| Hysteresis |  | 39.10 |  | 39.00 | 37.10 | 34.50 | 36.50 |
| SAG |  | 2.77 |  | 2.71 | 2.60 | 2.56 | 2.66 |
| elongation | 120 |  |  |  |  |  |  |
| burn length |  |  |  |  | 125.00 | entirely | 60.00 |
|  |  |  |  |  | 60.00 | 110.00 | entirely |
|  |  |  |  |  | 30.00 | 75.00 | 65.00 |
|  |  |  |  |  | 40.00 | entirely | 80.00 |
| Php Green component (approx) | 50 | 30 | 50 | 25 | 20 | 20 | 25 |

|  | Ex S | Ex T | Ex U | Ex V | Ex W | Ex X | Ex Y |
|---|---|---|---|---|---|---|---|
| L 4070 | 0.00 | 0.00 | 80.02 | 0.00 | 69.93 | 0.00 | 35.02 |
| Green A | 100.00 | 0.00 | 0.00 | 0.00 | 0.00 | 0.00 | 0.00 |
| Green B | 0.00 | 0.00 | 0.00 | 0.00 | 0.00 | 0.00 | 0.00 |
| Green C | 0.00 | 0.00 | 19.98 | 20.22 | 30.07 | 29.86 | 30.07 |
| Comparative Example 1 | 0.00 | 0.00 | 0.00 | 79.78 | 0.00 | 70.14 | 34.91 |
| Example 2 | 0.00 | 100.00 | 0.00 | 0.00 | 0.00 | 0.00 | 0.00 |
| Example 3 | 0.00 | 0.00 | 0.00 | 0.00 | 0.00 | 0.00 | 0.00 |
| Example 4 | 0.00 | 0.00 | 0.00 | 0.00 | 0.00 | 0.00 | 0.00 |
| Example 5 | 0.00 | 0.00 | 0.00 | 0.00 | 0.00 | 0.00 | 0.00 |
| Example 6 | 0.00 | 0.00 | 0.00 | 0.00 | 0.00 | 0.00 | 0.00 |
| TCCP | 11.15 | 9.95 | 0.00 | 0.00 | 0.00 | 0.00 | 0.00 |
| BF2370 | 0.00 | 0.00 | 0.80 | 3.34 | 0.79 | 0.80 | 0.80 |
| B8232 | 0.80 | 0.80 | 0.00 | 0.00 | 0.00 | 0.00 | 0.00 |
| Dabco | 0.20 | 0.20 | 0.19 | 0.21 | 0.20 | 0.19 | 0.20 |
| A1 | 0.09 | 0.09 | 0.09 | 0.11 | 0.10 | 0.11 | 0.11 |
| SnOct 33% | 0.45 | 0.38 | 0.43 | 0.43 | 0.37 | 0.37 | 0.36 |
| DEOA 90% | 0.00 | 0.00 | 0.00 | 0.00 | 0.00 | 0.00 | 0.00 |
| water add | 3.35 | 3.34 | 3.34 | 3.34 | 3.34 | 3.32 | 3.35 |
| water tot | 3.43 | 3.34 | 3.44 | 3.39 | 3.46 | 3.40 | 3.45 |
| TDI | 47.70 | 47.52 | 48.55 | 48.06 | 49.71 | 49.64 | 50.04 |
| index | 116.41 | 120.83 | 108.11 | 109.33 | 106.69 | 109.03 | 108.13 |
| cream rise | 11.00 | 11.00 | 12.00 | 11.00 | 17.00 | 15.00 | 15.00 |
| blow off | 0.07 | 0.07 | 0.07 | 0.06 | 0.08 | 0.08 | 0.08 |
| processing | good splits | OK good | good good | good | good good | good good | good good |
| Density | 29.20 | 30.45 | 27.35 | 27.70 | 27.80 | 27.85 | 27.60 |
| CLD 40% | 3.30 | 3.92 | 4.24 | 4.85 | 4.56 | 5.05 | 4.76 |
| Ball Rebound | 40.00 | 35.00 | 30.00 | 28.00 | 30.00 | 28.00 | 27.00 |
| CLD after HA |  |  |  |  |  |  |  |
| HALL % | 28.48 | 28.83 | 31.37 | 29.07 | 32.02 | 29.90 | 31.51 |
| afterflame time | 0.00 | 0.00 |  |  |  |  |  |
| Comp Set 75% | 3.50 | 5.00 | 6.90 | 8.40 | 11.30 | 11.70 | 13.30 |

-continued

| | | | | | | | |
|---|---|---|---|---|---|---|---|
| Hysteresis | 31.60 | 32.70 | 38.40 | 39.90 | 42.10 | 43.10 | 42.30 |
| SAG | 2.34 | 2.43 | 2.43 | 2.50 | 2.58 | 2.73 | 2.68 |
| burn length | 70.00 | 50.00 | | | | | |
| | 75.00 | 85.00 | | | | | |
| | 65.00 | entirely | | | | | |
| | 70.00 | entirely | | | | | |
| Php Green component (approx) | 30 | 30 | 20 | 20 | 30 | 30 | 30 |

| | Ex ZB | Ex ZC | Ex ZF |
|---|---|---|---|
| L 4070 | 49.79 | 0.00 | 0.00 |
| Green A | 0.00 | 0.00 | 0.00 |
| Green B | 0.00 | 0.00 | 0.00 |
| Green C | 0.00 | 0.00 | 0.00 |
| Comparative Example 1 | 0.00 | 49.97 | 0.00 |
| Example 2 | 0.00 | 0.00 | 49.44 |
| Example 3 | 50.21 | 50.03 | 50.56 |
| Example 4 | 0.00 | 0.00 | 0.00 |
| Example 5 | 0.00 | 0.00 | 0.00 |
| Example 6 | 0.00 | 0.00 | 0.00 |
| TCCP | 0.00 | 0.00 | 0.00 |
| BF2370 | 0.79 | 0.79 | 0.82 |
| B8232 | 0.00 | 0.00 | 0.00 |
| Dabco | 0.19 | 0.21 | 0.20 |
| A1 | 0.10 | 0.11 | 0.11 |
| SnOct 33% | 0.43 | 0.40 | 0.39 |
| DEOA 90% | 0.20 | 0.21 | 0.19 |
| water add | 3.32 | 3.34 | 3.33 |
| water tot | 3.36 | 3.36 | 3.35 |
| TDI | 46.97 | 47.60 | 47.69 |
| index | 114.01 | 116.69 | 118.48 |
| cream | 12.00 | 12.00 | 11.00 |
| rise | | | 0.08 |
| blow off | 0.08 | 0.08 | |
| | good | good | none |
| processing | good(tight) | good(tight) | splits |
| Density | 27.80 | 28.80 | 28.45 |
| CLD 40% | 4.34 | 5.07 | 4.88 |
| Ball Rebound | 25.00 | 26.00 | 27.00 |
| CLD after HA | | | |
| HALL % afterflame time | 28.00 | 25.25 | 27.87 |
| Comp Set 75% | 58.00 | 69.20 | 64.50 |
| Hysteresis | 45.00 | 47.80 | 46.20 |
| SAG | 2.99 | 3.10 | 3.00 |
| burn length | | | |
| Php Green component (approx) | 25 | 25 | 65 |

| | ExZJ | ExZK |
|---|---|---|
| L 4070 | 0.00 | 0.00 |
| Green A | 0.00 | 0.00 |
| Green B | 0.00 | 0.00 |
| Green C | 0.00 | 0.00 |
| Comparative Example 1 | | |
| Example 2 | 49.4 | 49.6 |
| Example 3 | 50.6 | 50.4 |
| Example 4 | 0.00 | 0.00 |
| Example 5 | 0.00 | 0.00 |
| Example 6 | 0.00 | 0.00 |
| TCCP | 0.00 | 0.00 |
| BF2370 | 0.82 | 0.82 |
| BF8232 | 0.00 | 0.00 |
| Dabco 33LV | 0.20 | 0.20 |
| A1 | 0.11 | 0.11 |
| SnOct 33% | 0.39 | 0.39 |
| DEOA 90% | 0.00 | 0.19 |
| water add | 3.33 | 3.33 |
| water tot | 3.35 | 3.35 |

-continued

|  |  |  |
|---|---|---|
| TDI index | 45.5 | 46.2 |
| cream rise | 105 | 105 |
| blow off |  |  |
| processing | good (small) splits | good |
| Density | 26.6 | 29.9 |
| CLD 40% | 2.23 | 4.4 |
| Ball Rebound | 23 | 25 |
| CLD after HA |  |  |
| HALL % | 23.3 | 23 |
| afterflame time |  |  |
| Comp Set 75% | 63 | 64.7 |
| Hysteresis | 45 | 47 |
| SAG | 3.0 | 2.85 |
| burn length |  |  |
| Php Green component (approx) | 65 | 65 |

|  | ZM | ZN | ZP | ZQ | ZR |
|---|---|---|---|---|---|
| P1388 (4156) |  |  | 49 |  |  |
| L 4070 |  |  |  | 49 |  |
| Modified Soy GreenB | 51 | 51 | 51 | 51 |  |
| P1388 Isocyanate modified polyol |  | 49 |  |  |  |
| L 4070 Isocyanate modified polyol | 49 |  |  |  |  |
| (P1388/Soy GreenB) Isocyanate modified polyol |  |  |  |  | 100 |
| Dabco 33lv | 0.2 | 0.2 | 0.2 | 0.2 | 0.2 |
| Amine A1 | 0.1 | 0.1 | 0.1 | 0.1 | 0.1 |
| Sn Oct 33% | 0.7 | 0.7 | 0.7 | 0.7 | 0.7 |
| Silicone BF2370 | 0.8 | 0.8 | 0.8 | 0.8 | 0.8 |
| Water Tot | 4 | 4 | 4 | 4 | 4 |
| TDI php | 51.9 | 51.9 | 52.2 | 52.2 | 52.2 |
| Density | 22.6 | 21.5 | 22.4 | 21.5 | 22.5 |
| Hardness 40% CLD kPa | 2.87 | 2.92 | 4.0 | 2.95 | 3.7 |
| Hardness after Humid age HALL | 2.1 | 2.42 | 3.12 | 2.39 | 2.78 |
| Hardness loss % | 26.8 | 17.1 | 22 | 18.9 | 24.8 |
| Hysteresis | 44 | 46.5 | 48.8 | 47.1 | 44 |
| Tensile kPa | 80 | 86 | 87 | 91 | 103 |
| Elongation % | 162 | 171 | 126 | 160 | 182 |
| Comp Set 75% | 16.5 | 11.6 | 14.3 | 15 | 8.5 |
| Php Green component (approx) | 51 | 51 | 51 | 51 | 51 |
| Processing | Excellent | Excellent | Excellent | Excellent | Excellent |

| | |
|---|---|
| P1388 (BASF) | 3000 mol wt hetero polyol |
| L 4070 (Europe) | 3000 mol wt all PO polyol |
| MODIFIED SOY POLYOL | Soy polyol GreenB reacted with 1php TDI in the presence of 0.004 php Kosmos EF |
| P1388 Isocyanate modified polyol | P1388 reacted with 1 php TDI and 0.004 php Kosmos EF |
| L 4070 Isocyanate modified polyol | L 4070 reacted with 1 php TDI and 0.004 php Kosmos EF |
| (P1388/Soy polyol GreenB)COMPOUND | 51/49 mix of soy polyol Green B and P1388, reacted with 1 php TDI and 0.004 php Kosmos EF |

In the foam Examples ZM to ZR, in contrast to Examples A to ZK, the water level was increased from approximately 3.35 php to 4.0 php and this time the TDI level was allowed to vary, but the TDI index itself was held constant at approximately 105. The NOP isocyanate modified polyol is based on soy oil based material and is diluted with various crude oil based polyols and also various isocyanate modified polyols based on different crude oil based polyols and then foamed according to the formulations shown. In contrast to Examples A to ZK, in ZM to ZR and also in the Further Data shown below, the isocyanate TDI has been used instead of polymeric MDI to make the various isocyanate modified polyols shown. Foam Example ZR is made from an isocyanate modified polyol made from a 51/49 mixture of the NOP and a crude oil based polyol. The best results are obtained if all, or as much as possible of the NOP(s) and the other, diluent polyol (s) present are isocyanate modified together prior to being made into a foam such as example ZR. In this formulation the soy and crude oil based polyol has been enhanced and the combination of it with the standard polyether polyol have been compatabalized to the maximum extent. All the polyols present in ZR have been isocyanate modified together. The physical properties of ZR are superior to examples ZN to ZQ. ZR also gives excellent compression sets and superior mechanical properties to all other foams in the ZM to ZR series. The processing characteristics of all foams were rated as excellent. Comparing ZM with ZN and then ZP with ZQ, it can be observed that the incorporation of a crude oil based polyol which contains some ethylene oxide, Pluracol 1388, whether as a diluent or as a copolyol to the NOP in the isocyanate modification process, additionally appears to give benefits in hardness and other properties compared to the all propylene oxide containing, for example, L 4070 polyol types.

Various isocyanate indexes known in the formulating art can obviously be used, eg indexes may vary from 75 to 140, and water level from 0.5 to 6 and up to 10 php or more.

In the Examples to show the invention:

"Water add" means total water added to the foam formulation

"Water tot" means total water present from all sources in the formulation

TDI is TDI80/20, an isomer blend of toluene diisocyanate

"Index" means the amount in percentage terms of the isocyanate added over and above the stoichiometric amount required by the reactants present.

"Cream" time is the time after initial mixing takes place for the reactants to form a creamy mix just prior to rapid expansion of the foam mass (in minutes and seconds)

"Rise" time is the total time elapsing between initial mixing of the ingredients and the end of the rise of the foam (in minutes and seconds)

"Blow off" reflects whether the foam released small bubbles as the rising phase of the foaming came to an end. When bubbles are released this is usually the sign of a good and stable foam. There are no units.

Processing describes whether the foam hesitated during the rising phase, did it falter, did it settle back after the rising phase was completed.

Density is measured in Kg/M3

SAG Factor (Support Factor) is a number calculated as the ratio of the 65% Compression force deflection, CLD, value to the 25% Compression force deflection, CLD, value (high numbers are good). SAG factors calculated by using Indentation Load Deflection numbers, as are commonly used in the United States for example, will have higher SAG Factor numbers compared the same measurements on the same foams using the CLD test method. (For example an IFD Sag Factor may be 2.3 and the SAG Factor from CLD measurements may be lower at say 2.1)

Ball Rebound is a measure of foam elasticity. A small steel ball is dropped onto the foam and its recovery height is expressed as a percent of initial vertical travel.

"HALL" is Humid Age Load Loss. The foam is put into a humid oven and its hardness is retested and compared to its original hardness as a percentage.

"Comp Set"—The foam is compressed to 75% of its original height under conditions of heat (not extreme humidity) and the final height of the foam after this test is compared with its original height.

Burn length—this is part of the vertical burn test of Cal TB117 and shows how far the flame progresses up the vertical sample in this well know flammability test.

CLD 40% is Compression load deflection and is a recognised foam hardness test method. The foam is compressed to 40% of its original height and the force required to do that is measured (in kPa).

CLD after HA is Compression Load Deflection after the Humid ageing test (Hall test).

Compressive strength (Vertical) is the Hardness of the rigid foam tested in the direction parallel to the direction of rise using test method BS4370, in kPa After flame time is the time elapsed between when the flame is removed from the sample and the sample continuing to burn with a flame (in seconds).

Hysteresis is a measure of the energy absorbed by the foam as it is compressed and then releases. A narrow hysteresis curve, a smaller number in the test, shows an elastic foam, and a thick curve shows a more viscoelastic foam with inferior elasticity.

Elongation is elongation at break. A sample of the foam is stretched and eventually breaks. Elongation at break is measured as the percentage the sample was stretched prior to failure expressed as a percentage of its original length.

Tensile Strength is the force necessary to break the foam under tension, kPa.

Further Data

| | | | | Isocyanate modification of the NOPs | | | | | |
|---|---|---|---|---|---|---|---|---|---|
| pbw | php | php | php | php | php | php | php | php | php |
| GreenE | | 99 | 99 | | 97.5 | | | 75 | |
| GreenC | 99 | | | 99 | | 96.5 | 97.5 | | 75 |
| P1388 | | | | | | | | 25 | 25 |
| DBTL | | | 0.002 | 0.002 | | | | | |
| Sn Oct 33% | 0.03 | 0.03 | | | | | | | |

-continued

| | | | | | | | | | |
|---|---|---|---|---|---|---|---|---|---|
| Kosmos EF | | | | | 0.03 | 0.03 | 0.03 | 0.03 | 0.03 |
| TDI 80/20 | 2.7 | 0.4 | 1 | 1 | 2.6 | 3.6 | 2.4 | 1 | 1 |
| % age of total OH groups being reacted | 11 | 4 | 11 | 4 | 28 | 15 | 10 | 9 | 9 |

Foams using Isocyante modified NOPs from above

| | | | | | | | | | |
|---|---|---|---|---|---|---|---|---|---|
| Iso Modified NOP from above | 0 | 50 | 50 | 0 | 50 | 0 | 0 | 100 | 0 |
| P1388 | 50 | 50 | 50 | 50 | 50 | 50 | 50 | 0 | 0 |
| Dabco 33LV | 0.20 | 0.20 | 0.20 | 0.20 | 0.20 | 0.20 | 0.20 | 0.20 | 0.20 |
| Amine A1 | 0.10 | 0.10 | 0.10 | 0.10 | 0.10 | 0.10 | 0.10 | 0.10 | 0.10 |
| Sn Oct 33% | 0.70 | 0.70 | 0.70 | 0.70 | 0.70 | 0.70 | 0.70 | 0.70 | 0.70 |
| Silicone B2370 | 0.80 | 0.80 | 0.80 | 0.80 | 0.80 | 0.80 | 0.80 | 0.80 | 0.80 |
| Iso Modified GreenC from above | 50 | | | 50 | | 50 | 50 | | 100 |
| Water | 4.00 | 4.00 | 4.00 | 4.00 | 4.00 | 4.00 | 4.00 | 4.00 | 4.00 |
| TDI (Index) | 105 | 105 | 105 | 105 | 105 | 105 | 105 | 105 | 90 |
| TDI php | 58.7 | 51.2 | 51.2 | 58.7 | 50.1 | 58.7 | 58.7 | 50.9 | 56.5 |
| Density Kg/m3 | 21.8 | 22.7 | 22.8 | 22.3 | 22.1 | 22.3 | 22.6 | 21.7 | 24.4 |
| Hardness 40% CLD kPa | 5.74 | 3.78 | 3.56 | 5.73 | 3.77 | 5.5 | 5.6 | 3.91 | 3.77 |
| Hardness after Humid age HALL % | 4.61 | 2.79 | 2.65 | 4.41 | 2.87 | 4.5 | 4.52 | 3.02 | 2.72 |
| Hardness Loss % | 19.7 | 26.2 | 25.6 | 23 | 23.9 | 18.2 | 19.3 | 22.8 | 27.8 |
| Hysteresis % | 19 | 25 | 25 | 19 | 24 | 21 | 20 | 25 | 20 |
| Tensile kPa | 93 | 90 | 88 | 94 | 88 | 105 | 92 | 70 | 79 |
| Elongation % | 83 | 122 | 125 | 80 | 110 | 85 | 78 | 71 | 88 |
| Processing Comments | Excellent | Excellent | Excellent | Excellent | Excellent | Excellent | Excellent | Excellent | Excellent |
| Php Green content Approx % | 50 | 50 | 50 | 50 | 50 | 50 | 50 | 75 | 75 |

The above table shows the preparation of various isocyanate modified NOPs with between 4 and 28% of the available hydroxyl groups present in the polyol component being reacted with isocyanate. Also, various metal catalysts at various levels are shown being used to promote the hydroxyl-isocyanate interactions of the invention.

Varying the percentage of OH groups reacted at the isocyanate modified polyol preparation stage will affect the processing and physical properties. In particular the final foam will be harder as the percent of hydroxyls reacted increases.

Also, varying the level and type of metal catalyst can effect processing physical properties, and especially, again, the foam hardness.

In the above Further Examples: Some of the range of the invention is demonstrated.

Excellent foams are easily produced and the percentage of replacement of the conventional crude oil polyols by NOPs is demonstrated at 50 and 75% levels.

Further data for Rigid foams

| Php | ZS | ZT | ZU | ZW | ZX | ZY |
|---|---|---|---|---|---|---|
| Isocyanate Modification | | | | | | |
| Voranol CP450 | 0 | 0 | | 70 | | 70 |
| NOP GreenF | 0 | 0 | 100 | 30 | 100 | 30 |
| Catalyst DBTL | 0 | 0 | 0.004 | 0.004 | | |

-continued

| Php | ZS | ZT | ZU | ZW | ZX | ZY |
|---|---|---|---|---|---|---|
| Catalyst Kosmos EF | 0 | 0 | | | 0.004 | 0.004 |
| Wannate pMDI | 0 | 0 | 1 | 1 | 1 | 1 |
| Foam Reaction | | | | | | |
| Iso Modified polyol ex above | 0 | 0 | 30 | 100 | 30 | 100 |
| Voranol CP 450 | 100 | 70 | 70 | 0 | 70 | 0 |
| NOP GreenF | 0 | 30 | 0 | 0 | 0 | 0 |
| Water | 1.5 | 1.5 | 1.5 | 1.5 | 1.5 | 1.5 |
| Silicone B1048 | 1.2 | 1.2 | 1.2 | 1.2 | 1.2 | 1.2 |
| Amine PMDETA | 0.2 | 0.2 | 0.2 | 0.2 | 0.2 | 0.2 |
| Amine DMCHA | 1.8 | 1.8 | 1.8 | 1.8 | 1.8 | 1.8 |
| Blowing Agent 365/227 | 12 | 12 | 12 | 12 | 12 | 12 |
| Wannate pMDI (Index) | 110 | 110 | 110 | 110 | 110 | 110 |
| Centre Cube (Core) Densities Kg/m3 | 43.7/47.64 | 43.2/48.5 | 42.8/46.4 | 43.1/46.4 | 41.8/44.4 | 42.3/45.9 |
| Vertical Compressive strengths BS 4370 (kPa) | 214/253 | 222/254 | 212/232 | 224/250 | 195/226 | 208/236 |
| Average Vertical strength (kPa) at 45 Kg/m3 | 226.5 | 232.5 | 224 | 239 | 233.5 | 229 |

Pairs of Rigid foams samples were prepared using each of the formulations above. A statistical analysis of the pairs of data from above formulations shows that the foam with the highest Average compression strength value in the vertical axis, at the test core density of 45 Kgs/m3 is the one in ZW which is made using a mixture of the NOP and rigid polyol which has been reacted with the isocyanate using DBTL as the PU gelation catalyst. This foam is 2.8% harder that the nearest other foam, ZT, made from the simple NOP and rigid polyol mixture. ZS contains no NOP and is the softest foam. The above rigid foams ZU to ZY also demonstrate that choice of PU gelation catalyst for the isocyanate modification process can effect the macro polymer created and the properties of the urethane material obtained. Polymeric MDI was used in the preparation of the isocyanate modified polyols and the foams in the above Rigid Foam examples Compatibility Tests The photograph depicted in FIG. 1 shows the separation which occurs when, on the right, 20 pbw of Green C is thoroughly mixed with 80 pbw of Voranol RA 800 a standard rigid polyol, and allowed to stand for just 12 hours at room temperature of approximately 18 degrees centigrade. The mixture shows almost complete separation of the two polyols in this short time period. The jar on the left shows an identical mixture of NOP and Voranol RA 800 which has been agitated and reacted with 1 php of TDI and 0.004 php of the Kosmos EF as described in the invention. There is substantially no separation of the two incompatible polyols after the same 12 hours period, showing how the invention increases the compatibility of the NOP in the urethane system giving the benefits claimed by the invention. This characteristic will make it possible to prepare ship and store a pre-blended resin system, which contains NOP as part of the polyol present, which find use in the worldwide rigid and flexible foam systems industry.

It is of course to be understood that the invention is not intended to be restricted to the details of the above example formulations, which are described by way of example only.

In addition to providing a method of making polyurethane foam the invention provides new storage stable isocyanate modified polyols for use in making such foams, as hereinbefore described.

The invention claimed is:

1. A method of making polyurethane foam comprising a lipid-based polyol, the method including (a) making a prepolymer and then (b) making polyurethane foam using the prepolymer, the method comprising:
(a) first making a prepolymer by a method comprising the steps of:
providing at least one lipid-based polyol, a first amount of multifunctional isocyanate, a first amount of at least one gelation catalyst, and optionally a petrochemical polyol; and
combining the lipid-based polyol, the first amount of isocyanate, the first amount of at least one gelation catalyst, and also said petrochemical polyol when present, together to form a polyol/isocyanate blend;
reacting the polyol/isocyanate blend substantially without the use of added heat;
thereby creating a prepolymer, the prepolymer being substantially unfoamed, and having available unreacted OH functional groups; and
(b) providing the prepolymer previously created in step (a); and
combining the prepolymer with a second amount of multifunctional isocyanate, with a foaming agent, optionally with a second amount of gelation catalyst, and optionally with a petrochemical polyol; and
reacting the prepolymer, the second amount of isocyanate, the foaming agent, and said petrochemical polyol when present, in the presence of said second amount of gelation catalyst when present;
thereby creating a polyurethane foam;
wherein the first amount of at least one gelation catalyst is from 0.001 to 0.1 millimoles per each 100 grams of all polyols in the polyol/isocyanate blend;
wherein the first amount of multifunctional isocyanate is in the range of from 0.01% to 33% of the stoichiometric amount of the multifunctional isocyanate(s) that would be required to react with all the available hydroxyl groups of the polyol(s) in the polyol/isocyanate blend;
wherein the first amount of isocyanate comprises at least one of methylene diphenyl diisocyanate (MDI) and toluene diisocyanate (TDI); and
wherein the polyol/isocyanate blend comprises sufficient lipid-based polyol so that the total lipid-based polyol content of the polyurethane foam is not less than 50% relative to the total polyol content of the foam by weight.

2. The method of making polyurethane foam of claim 1, wherein the at least one lipid-based polyol provided and combined in the prepolymer step (a), and which is present in the final polyurethane foam, comprises soybean based polyol, palm oil based polyol, or a blend thereof.

3. The method of making polyurethane foam of claim 1, wherein the prepolymer created in step (a) has a viscosity at 25 degrees Celsius of not more than 8,000 mPa·s.

4. The method of making polyurethane foam of claim 1, wherein the prepolymer created in step (a) has a viscosity at 25 degrees Celsius of not more than 3,000 mPa·s.

5. The method of claim 1, further comprising providing ricinoleic acid and adding the ricinoleic acid to the polyol/isocyanate blend.

6. The method of claim 1, wherein the step of (a) making a prepolymer further comprises:
providing a first amount of at least one petrochemical polyol in addition to said at least one lipid-based polyol;
combining the petrochemical polyol with the at least one lipid-based polyol, the first amount of multifunctional isocyanate, and the first amount of at least one gelation catalyst, to form the polyol/isocyanate blend; and
reacting the polyol/isocyanate blend to create a prepolymer;
wherein the prepolymer comprises substantially all of the polyol that is in the resulting polyurethane foam.

7. The method of making polyurethane foam of claim 6:
wherein the at least one lipid-based polyol provided and combined in the prepolymer step (a), and which is present in the final polyurethane foam, comprises of soybean based polyol, palm oil based polyol, or a blend thereof.

8. The method of making polyurethane foam of claim 1, wherein the first amount of multifunctional isocyanate is in the range of from 0.1% to 20% of the stoichiometric amount of the multifunctional isocyanate(s) that would be required to react with all the available hydroxyl groups of the polyol(s) in the polyol/isocyanate blend.

9. The method of making polyurethane foam of claim 1, wherein the combining portion of step (b) making a polyurethane foam comprises combining the prepolymer with a second amount of multifunctional isocyanate, with a foaming agent, and also with a second amount of gelation catalyst; and
wherein the reacting portion of step (b) comprises reacting the prepolymer, the isocyanate, and the foaming agent in the presence of the second amount of gelation catalyst;
thereby creating a polyurethane foam.

10. The method of making polyurethane foam of claim 1, wherein the polyol/isocyanate blend comprises sufficient lipid-based polyol so that the total lipid-based polyol content of the polyurethane foam is from 50% to 75% relative to the total polyol content of the foam by weight.

11. The method of making polyurethane foam of claim 1:
wherein the polyol/isocyanate blend comprises sufficient lipid-based polyol so that the total lipid-based polyol content of the polyurethane foam is from 50% to 75% relative to the total polyol content of the foam by weight; and
wherein the at least one lipid-based polyol in the prepolymer and in the polyurethane foam consists of soybean based polyol, palm oil based polyol, or a blend thereof.

12. The method of making polyurethane foam of claim 1:
wherein the polyol/isocyanate blend comprises sufficient lipid-based polyol so that the total lipid-based polyol content of the polyurethane foam is from 50% to 75% relative to the total polyol content of the foam by weight; and
wherein the at least one gelation catalyst provided and combined in the prepolymer step (a) is selected from dibutyltindilaurate (DBTL), stannous octoate, and tin ricinoleate.

13. The method of making polyurethane foam of claim 1:
wherein the polyol/isocyanate blend comprises sufficient lipid-based polyol so that the total lipid-based polyol content of the polyurethane foam is from 50% to 75% relative to the total polyol content of the foam by weight; and
wherein the hardness of the resulting polyurethane foam is from 2.87 kPa to 5.74 kPa, as measured by the 40% compression load deflection (CLD 40%) method.

14. The method of making polyurethane foam of claim 1:
wherein the polyol/isocyanate blend comprises sufficient lipid-based polyol so that the total lipid-based polyol content of the polyurethane foam is from 50% to 75% relative to the total polyol content of the foam by weight; and
wherein the hardness of the resulting polyurethane foam is from 3.77 kPa to 5.74 kPa, as measured by the 40% compression load deflection (CLD 40%) method.

15. The method of making polyurethane foam of claim 1:
wherein the polyol/isocyanate blend comprises sufficient lipid-based polyol so that the total lipid-based polyol content of the polyurethane foam is from 50% to 75% relative to the total polyol content of the foam by weight; and
wherein the elongation of the resulting polyurethane foam, measured as a distance that the sample is stretched to prior to breaking as a percentage of its original length, is 71 to 182%.

16. The method of making polyurethane foam of claim 1:
wherein the polyol/isocyanate blend comprises sufficient lipid-based polyol so that the total lipid-based polyol content of the polyurethane foam is from 50% to 75% relative to the total polyol content of the foam by weight; and
wherein the first amount of multifunctional isocyanate is in the range of from 4% to 28% of the stoichiometric amount of the multifunctional isocyanate(s) that would be required to react with all the available hydroxyl groups of the polyol(s) in the polyol/isocyanate blend.

17. The method of making polyurethane foam of claim 1:
wherein the hardness of the resulting polyurethane foam is from 3.77 kPa to 5.74 kPa, as measured by the 40% compression load deflection (CLD 40%) method.

18. A method of making polyurethane foam comprising a lipid-based polyol, the method including (a) making a prepolymer and then (b) making polyurethane foam using the prepolymer, the method comprising:
(a) first making a prepolymer by a method comprising the steps of:
providing at least one lipid-based polyol, a first amount of multifunctional isocyanate, a first amount of at least one gelation catalyst, and optionally a petrochemical polyol; and
combining the at least one lipid-based polyol, the first amount of isocyanate, the first amount of at least one gelation catalyst, and also said petrochemical polyol when present, together to form a polyol/isocyanate blend;
reacting the polyol/isocyanate blend substantially without the use of added heat;

thereby creating a prepolymer, the prepolymer being substantially unfoamed, and having available unreacted OH functional groups; and (b) providing the prepolymer previously created in step (a); and combining the prepolymer with a second amount of multifunctional isocyanate, with a foaming agent, optionally with a second amount of gelation catalyst, and optionally with a petrochemical polyol; and reacting the prepolymer, the second amount of isocyanate, the foaming agent, and said petrochemical polyol when present, in the presence of said second amount of gelation catalyst when present;

thereby creating a polyurethane foam;

wherein the first amount of at least one gelation catalyst is from 0.001 to 0.1 millimoles per each 100 grams of all polyols in the polyol/isocyanate blend;

wherein the first amount of multifunctional isocyanate is in the range of from 0.01% to 33% of the stoichiometric amount of the multifunctional isocyanate(s) that would be required to react with all the available hydroxyl groups of the polyol(s) in the polyol/isocyanate blend;

wherein the first amount of isocyanate comprises at least one of methylene diphenyl diisocyanate (MDI) and toluene diisocyanate (TDI); and wherein the polyol/isocyanate blend comprises sufficient lipid-based polyol so that the total lipid-based polyol content of the polyurethane foam is not less than 30% relative to the total polyol content of the foam by weight.

19. The method of making polyurethane foam of claim 18:

wherein the combining portion of step (b) making a polyurethane foam comprises combining the prepolymer with a second amount of multifunctional isocyanate, with a foaming agent, and also with a second amount of gelation catalyst; and wherein the reacting portion of step (b) comprises reacting the prepolymer, the isocyanate, and the foaming agent in the presence of the second amount of gelation catalyst;

thereby creating a polyurethane foam.

20. The method of making polyurethane foam of claim 18:

wherein the at least one lipid-based polyol provided and combined in the prepolymer step (a), and which is present in the final polyurethane foam, comprises of soybean based polyol, palm oil based polyol, or a blend thereof.

* * * * *